United States Patent
Coletti et al.

(10) Patent No.: US 11,913,091 B2
(45) Date of Patent: Feb. 27, 2024

(54) TIN PRODUCTION, WHICH INCLUDES A COMPOSITION COMPRISING TIN, LEAD, SILVER AND ANTIMONY

(71) Applicant: METALLO BELGIUM, Beerse (BE)

(72) Inventors: Bert Coletti, Beerse (BE); Yves De Visscher, Beerse (BE); Charles Geenen, Beerse (BE); Jan Dirk A. Goris, Beerse (BE); Koen Govaerts, Beerse (BE); Pelle Lemmens, Beerse (BE); Kris Mannaerts, Beerse (BE)

(73) Assignee: Metallo Belgium, Beerse (BE)

( * ) Notice: Subject to any disclaimer, the term of this patent is extended or adjusted under 35 U.S.C. 154(b) by 419 days.

(21) Appl. No.: 17/423,469

(22) PCT Filed: Jan. 30, 2020

(86) PCT No.: PCT/EP2020/052225
§ 371 (c)(1),
(2) Date: Jul. 15, 2021

(87) PCT Pub. No.: WO2020/157167
PCT Pub. Date: Aug. 6, 2020

(65) Prior Publication Data
US 2022/0074020 A1     Mar. 10, 2022

(30) Foreign Application Priority Data
Jan. 30, 2019   (EP) ................................. 19154610

(51) Int. Cl.
*C22B 9/02* (2006.01)
*B01D 3/14* (2006.01)
(Continued)

(52) U.S. Cl.
CPC ................ *C22B 9/02* (2013.01); *B01D 3/148* (2013.01); *B01D 9/004* (2013.01); *B23K 35/262* (2013.01); *C22C 13/02* (2013.01); *C25C 3/36* (2013.01)

(58) Field of Classification Search
CPC .................................................. B23K 35/262
See application file for complete search history.

(56) References Cited

U.S. PATENT DOCUMENTS

| | | |
|---|---|---|
| 1,674,642 A | 6/1928 | Harris |
| 5,690,890 A | 11/1997 | Chaki et al. |

FOREIGN PATENT DOCUMENTS

| | | |
|---|---|---|
| CN | 102534249 A | 7/2012 |
| CN | 103667744 A | 3/2014 |

(Continued)

OTHER PUBLICATIONS

Machine Translation of JP 51054056 (Year: 2023).*
(Continued)

*Primary Examiner* — Alexandra M Moore
(74) *Attorney, Agent, or Firm* — Christensen O'Connor Johnson Kindness PLLC

(57) ABSTRACT

Metal compositions and processes for fractional crystallization of a molten crude tin mixture containing lead and silver are described. A process includes separating the molten crude tin mixture into a first silver-enriched liquid drain product at the liquid end of a crystallization step and a first tin-enriched product at the crystal end of the crystallization step whereby the first silver-enriched liquid drain product comprises on a dry weight basis 6.0-30.0% wt of lead, 70.0-91% wt of tin, 95.0-99.0% wt of lead and tin together, 0.75-5.00% wt of silver, and ≥0.24% wt of antimony. The first silver enriched liquid drain product also includes at least one of: 0.05-0.5% wt of arsenic; 0.05-0.6% wt of copper, 0.0030-0.0500% wt of nickel, at least 0.0010-0.40% wt of (Continued)

bismuth, at most 1.0% wt of iron, or at least 0.0005% wt of gold, the balance being impurities.

15 Claims, 1 Drawing Sheet

(51) Int. Cl.
| | | |
|---|---|---|
| *B01D 9/00* | (2006.01) | |
| *B23K 35/26* | (2006.01) | |
| *C22C 13/02* | (2006.01) | |
| *C25C 3/36* | (2006.01) | |

(56) References Cited

FOREIGN PATENT DOCUMENTS

| CN | 105970003 A | 9/2016 |
|---|---|---|
| CN | 205710871 U | 11/2016 |
| CN | 102534249 A | 7/2021 |
| DE | 10153974 A1 | 5/2003 |
| EP | 0507718 A1 | 7/1992 |
| JP | 51054056 A * | 5/1976 |
| JP | H10180482 A | 7/1998 |
| JP | 2004223571 A | 8/2004 |
| WO | 2018060202 A1 | 4/2018 |
| WO | 2019219821 A1 | 11/2019 |

OTHER PUBLICATIONS

Taguchi, T., et al. "Lead Free Interfacial Structures and Their Relationship to Au Plating (including accelerated Thermal Cycle Testing of Non-Leaden BGA spheres)", Proceedings of the Electronic Components and Technology Conference, Piscataway, NJ, May 29-Jun. 1, 2001, pp. 668-673.

International Search Report dated Jul. 31, 2020 issued in corresponding International Application No. PCT/EP2020/052225 filed Jan. 30, 2020 (6 pages).

Written Opinion dated Jul. 31, 2020 issued in corresponding International Application No. PCT/EP2020/052225 filed Jan. 30, 2020 (17 pages).

* cited by examiner

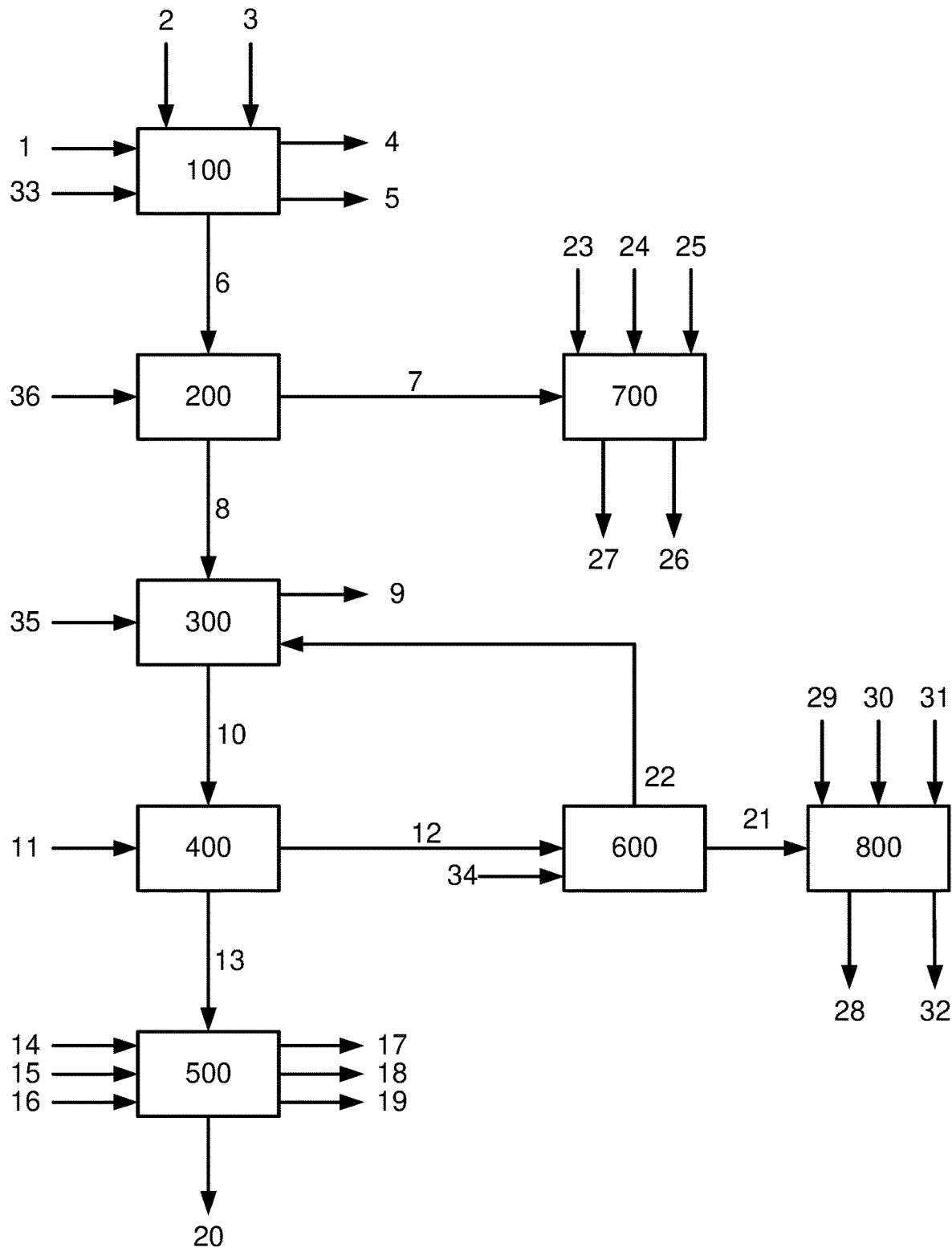

TIN PRODUCTION, WHICH INCLUDES A COMPOSITION COMPRISING TIN, LEAD, SILVER AND ANTIMONY

CROSS-REFERENCES TO RELATED APPLICATIONS

This application is a national phase entry of and claims priority to international patent application PCT/EP2020/052225, entitled "IMPROVED TIN PRODUCTION," filed on Jan. 30, 2020, and further claims priority to European patent application EP19154610.0, entitled "IMPROVED TIN PRODUCTION," filed on Jan. 30, 2019, the contents of both of which are hereby incorporated by reference in their entirety.

FIELD OF THE INVENTION

The present invention relates to the recovery of silver in the production of tin (Sn), possibly in combination with the production of copper (Cu) and lead (Pb), from primary sources and/or secondary feedstocks. More particularly the present invention relates to the separation of silver from a molten crude tin mixture by fractional crystallisation.

BACKGROUND OF THE INVENTION

Silver is undesired as a contaminant of tin metal. Significant presence of silver in tin metal deteriorates the mechanical properties of tin metal. Silver presence in tin that is used in tin plating of steel further generates the risk for the occurrence of galvanic corrosion, whereby the wall of the tin can would be corroding from the inside to the outside surface. This represents a major problem for tin cans to be used in the food industry.

Other end-uses of tin may also be sensitive to contaminants, and similarly require a high purity tin quality. This for instance applies for the preparation of high-grade lead-free solder, in the manufacture of semiconductor compounds such as tin nitride, antimony telluride, tin arsenide and superconductor alloys.

Silver is also a metal having significant market value, typically much higher than the market value of the most common non-ferrous metals, such as copper and lead, and even of tin. Silver may be found in small quantities in the on an industrial scale available feedstocks of other non-ferrous metals, such as copper, lead and/or tin, and in particular in secondary feedstocks for these metals. The concentrations of silver in the non-ferrous metals containing streams in the pyrometallurgical refining steps in the production of copper and/or lead are however very low, usually far too low for justifying its separate recovery. The applicants have found, when tin is present in the pyrometallurgical refining of copper and/or lead and the recovery of enriched tin streams is part of the same process, that silver metal may tend to follow the main pathway of the tin metal through the process and be retrieved in the tin-containing process streams, including solder streams based on a mixture of Pb and Sn. The silver concentrations in these pyrometallurgical tin-containing streams are however still relatively low. When the process includes the recovery of a high purity tin metal prime product, the silver levels are however readily so high that they are undesired in the tin prime product.

There therefore has been a need for the recovery of silver from tin-containing streams containing relatively low levels of silver, such as lead/tin mixtures often addressed as "solder" streams.

CN205710871(U) and CN105970003(A) disclose a process for recovering silver from crude solder containing Sn/Pb/Ag (62-78%, 20-38%, 0.2-2.0% wt). The melted solder is contacted with molten zinc to form two intermetallic compounds having high melting points: $Ag_2Zn_3$ (665° C.) and/or $Ag_2Zn_5$ (636° C.). These solid intermetallic compounds may readily be separated off as a zinc-silver alloy from the molten solder having a melting temperature of 185-190° C. in a crystalliser type apparatus by establishing a temperature profile ranging from 410-430° C. stepwise down to 220-200° C. in the six or eight temperature zones of the apparatus. The drawback of this process is that the silver is obtained in a chemically bound form as part of the intermetallic compounds, which makes its recovery more difficult.

The use of fractional crystallisation in the processing of tin containing molten metal streams is also known.

CN 103667744 discloses a batch 2-step fractional crystallisation process for upgrading a 99.9+% grade tin to a 99.99+% grade tin. The first step removes at its high temperature end a tin alloy containing at most 99.88% wt of tin, enriched in arsenic, copper, iron and antimony from an eutectic alloy that is kept in the 6-zone crystalliser. The second step, using a different temperature profile in the same equipment, removes at its lower temperature end an eutectic alloy containing at most 99.91% wt of tin, enriched in lead, indium and bismuth from the target 99.99+% grade tin product. Only about half of the quantity of 99.9+% grade tin starting material ends up as the 99.99+% grade tin prime product. The drawbacks of this process are therefore the high amount of lower grade tin alloy by-products, the complexity of the process, and the need to perform this process in batch mode. The by-products are still very dilute in any element other than tin, and hence do not represent an interesting source for the recovery thereof. Silver presence in this process is extremely low, i.e. at most 5 ppm wt in the starting materials, and at most 21 ppm wt in the by-product obtained from step 2. CN 103667744 is clearly not concerned with the recovery of the small amounts of silver in the starting materials.

CN 102534249 B describes a process that removes by fractional crystallisation a significant amount of the tin present in a high silver crude tin feedstock further containing about 8% of lead and about 1% wt of silver. The purpose of the process is to reduce the volume of the metal mixture before feeding this mixture to the electrolytic recovery of precious metals, and claims to bring the volume down in the range of 10-30% of the starting volume before the crystallisation step. The crystalliser is filled with the crude tin and the temperatures in the 4 zones or stages are controlled within specified ranges, climbing from zone 1 (about 235° C.) to zone 4 (about 650° C.). The crude tin is fed continuously to the crystalliser and the solder co-product is continuously withdrawn. The refined tin produced is collecting as crystals in the hot end of the crystalliser and contains at least 99.96% wt of tin, less than 0.03% wt of lead and less than 100 ppm wt of silver. The solder which is produced by the crystalliser contains 20-30% wt of lead and 2.5-4.6% wt of silver, the balance being tin, and is intended for being sent to the downstream electrolysis step for the electrolytic recovery of precious metals. The process reduces the amount of material that needs to be processed by the downstream electrolysis step down to only 10-30% in comparison with the same process not including the intermediate crystallisation step. The drawback of the process of CN 102534249 B is that it achieves a concentration factor of only at most 4 for the silver concentration from the feed to the drain by-product. This may make the process suitable for handling a feedstock in which the silver level is already significant (about 1% wt). For more dilute feedstocks, this process leaves things to be desired. Another drawback is that the amount of drain produced is still high, representing as much as about ¼ to ⅓ of the amount of starting material that is fed to the crystalliser.

There therefore remains a need for a process for the recovery of silver from tin-containing molten metal streams which is able to start from a feedstock that is rather dilute in silver content but which process is at the same time able to deliver the silver in a co-product stream that is sufficiently rich in silver such that it qualifies as a feedstock suitable for the recovery of the silver therefrom.

The present invention aims to obviate or at least mitigate the above described problem and/or to provide improvements generally.

SUMMARY OF THE INVENTION

According to the invention, there is provided a metal composition and a process as defined in any of the accompanying claims.

In an embodiment, the present invention provides for a metal composition comprising, on a dry weight basis,
at least 6.0% wt and at most 30.0% wt of lead,
at least 70.0% wt and at most 91% wt of tin,
at least 95.0% wt and at most 99.0% wt of lead and tin together,
at least 0.75% wt and at most 5.00% wt of silver, and
at least 0.24% wt of antimony.

In another embodiment, the present invention provides for a metal composition consisting of, on a dry weight basis,
at least 6.0% wt and at most 30.0% wt of lead,
at least 70.0% wt and at most 91% wt of tin,
at least 95.0% wt and at most 99.0% wt of lead and tin together,
at least 0.75% wt and at most 5.00% wt of silver, and
at least 0.24% wt of antimony,
and is optionally further containing, on the same basis,
at least 0.05% wt and at most 0.5% wt of arsenic,
at least 0.05% wt and at most 0.6% wt of copper,
at least 0.0030% wt and at most 0.0500% wt of nickel,
at least 0.0010% wt and at most 0.40% wt of bismuth,
at most 1.0% wt of iron, and
at least 0.0005% wt and preferably at most 0.0500% wt of gold,
the balance being impurities.

The applicants have found that the metal composition according to the present invention, which preferably is obtained as the first silver-enriched liquid drain product from the crystalliser of the process according to the present invention described further below, is a surprisingly suitable feedstock for the recovery of silver by means of an electrolysis step wherein the cathode is collecting most of the Sn and Pb, and if desired also a portion of the Sb, from the anode cast from the metal composition, and the silver is collected as part of the anode slime. A suitable technique for this electrorefining step is using an electrolyte based on hexafluorosilicic acid ($H_2SiF_6$), fluoroboric acid and/or phenyl sulphonic acid; a temperature of about 35-40° C.; a current density in the range of 100-200 $A/m^2$, and an electrode spacing of about 100 mm.

The applicants have found, during the electrolysis of anodes cast from the metal composition according to the present invention, which preferably is obtained as the first silver-enriched liquid drain product from the crystalliser of the process according to the present invention, that the anode slime which is forming remains better adhered to the anode, and that much less of the anode slime, if any, may become dispersed in the electrolyte. This represents a significant advantage in the recovery of the anode slime from this electrolysis step. The anode after a period of use in the electrolysis cell may be pulled from the electrolysis bath, and the anode slime may be scraped off from the anode. The cleaned anode may then be returned to the electrolysis cell for further service, or may be recycled as "spent anode" to the upstream anode casting step.

This method of anode slime recovery is much easier than the conventional method wherein anode slime disperses in the electrolyte, maybe collects in the bottom of the cell, and needs to be recovered as part of a filter cake obtained from a sedimentation and/or filtration step included in the electrolyte cycle or in a pump around over the electrolysis cell. The conventional method also uses flocculants and other chemicals to facilitate and enhance the sedimentation and/or filtration steps, and which may affect the electrolysis step itself and/or end up in the anode slime product.

Without wanting to be bound by this theory, the applicants believe that the advantage of the metal composition according to the present invention, which preferably is obtained as the first silver-enriched liquid drain product from the crystalliser of the process according to the present invention, in that the anode slime formed in the electrolysis remains adhered to the anode, is caused by the minimum presence of antimony in the metal composition, as prescribed, optionally enhanced by bismuth, which is believed to contribute to the same effect. The applicants believe that this effect may readily be achieved when the level of antimony concentration in the metal composition according to the present invention is not excessively high, i.e. below 5% wt, a condition which is inherently complied with because of the lower limits for tin plus lead together, and for silver.

The applicants have found that also the relative presence of tin and lead brings an advantage to the metal composition according to the present invention, which preferably is obtained as the first silver-enriched liquid drain product from the crystalliser of the process according to the present invention. In the two phase diagram of Pb vs Sn, the composition is located at the tin-side of the eutectic composition, where the melting temperatures are lower than on the lead side of the binary diagram. This brings the advantage that the melting temperature and/or the viscosity of the metal composition according to the present invention are lower. This brings advantages in the casting of the anodes from the metal composition according to the present invention, because the lower viscosity brings the benefit of a better filling of the mould, and the lower melting temperature brings the benefit of a higher dimensional stability of the cast anodes, such as less risk for warping or other forms of deformation during cooling of the anode after its casting.

The applicants have further found that the high amount of tin relative to antimony, as specified inherently by the conditions specified for the metal composition according to the present invention, which preferably is obtained as the first silver-enriched liquid drain product from the crystalliser of the process according to the present invention, contributes to a stable operation of the electrolysis step as described because the ion content of the electrolyte stays more constant over time.

In an embodiment, the present invention provides for a process for the fractional crystallisation of a molten crude tin mixture containing lead and silver, into a first silver-enriched liquid drain product at the liquid end of the crystallisation step and a first tin-enriched product at the crystal end of the crystallisation step, whereby the first silver-enriched liquid drain product comprises, on a dry weight basis,
- at least 6.0% wt and at most 30.0% wt of lead,
- at least 70.0% wt and at most 91% wt of tin,
- at least 95.0% wt and at most 99.0% wt of lead and tin together,
- at least 0.75% wt and at most 5.00% wt of silver, and
- at least 0.24% wt of antimony.

In another embodiment of the process according to the present invention, the first silver-enriched liquid drain product consists of, on a dry weight basis,
- at least 6.0% wt and at most 30.0% wt of lead,
- at least 70.0% wt and at most 91% wt of tin,
- at least 95.0% wt and at most 99.0% wt of lead and tin together,
- at least 0.75% wt and at most 5.00% wt of silver, and
- at least 0.24% wt of antimony.

and is optionally further containing, on the same basis,
- at least 0.05% wt and at most 0.5% wt of arsenic,
- at least 0.05% wt and at most 0.6% wt of copper,
- at least 0.0030% wt and at most 0.0500% wt of nickel,
- at least 0.0010% wt and at most 0.40% wt of bismuth,
- at most 1.0% wt of iron, and
- at least 0.0005% wt and preferably at most 0.0500% wt of gold, the balance being impurities.

In an embodiment, the process according to the present invention is producing the metal composition according to the present invention and is characterized in that the crude tin mixture comprises at least 0.1% wt and at most 7.0% wt of lead.

In an embodiment, the present invention provides for a process for the fractional crystallisation of a molten crude tin mixture containing silver, into a first silver-enriched liquid drain product at the liquid end of the crystallisation step and a first tin-enriched product at the crystal end of the crystallisation step, characterized in that the crude tin mixture comprises at least 0.1% wt and at most 7.0% wt of lead.

The applicants have found that the presence of lead in the range as specified brings significant advantages to the process according to the present invention and to at least some of the products it produces.

One advantage is that a minimum presence of lead, as specified, in the feed to the fractional crystallisation is a process enabler for the fractional crystallisation step.

A mixture of 38.1% wt Pb and 61.9% wt Sn has a melting temperature of only 183° C., i.e. lower than the melting temperatures of pure lead (327.5° C.) and of pure tin (232° C.). The 38.1/61.9 percent mixture is called an eutectic composition. When a molten binary mixture of tin and lead having a composition that is different from the eutectic composition is cooled, crystals form which have a composition that differs even more from the eutectic composition, and a liquid phase remains which is having a composition that is closer to the eutectic composition. The applicants have found that this phenomenon allows to separate a mixture of lead and tin, by fractional crystallisation, into on the crystal side, a product that is enriched in either Sn or Pb, and on the liquid side, a product that is having a composition that is closer to the eutectic composition. The minimum presence of lead in the starting material thus enables the separation by fractional crystallisation of a higher purity tin product at the crystal end from a liquid product containing more lead than the starting material.

The applicants have further found, with a lead/tin mixture that is containing more tin than the eutectic composition of tin with lead, and if that mixture is further containing relatively small amounts of silver, that in a fractional crystallisation of the mixture, the silver prefers to stay with most of the lead in the liquid phase, and that tin crystals may be obtained that are much lower in silver and lead. The applicants have found that the lead acts as a carrier for the silver. The applicants have further found, in such fractional crystallisation process, that the silver may be concentrated up from a lower level in the feed mixture to a higher level in the liquid crystalliser product.

The applicants have further found, when the amount of lead in the feed to the fractional crystallisation step is kept below the upper limit as specified, that the silver concentration increase from feed to liquid crystallisation product may be significantly improved. The applicants have found that this allows for the processing of starting materials that contain rather low concentrations of silver, and yet, at the same time, for obtaining a product stream which is limited in volume and significantly enriched in silver content, such that it becomes suitable for further processing with the purpose of recovering the silver.

The applicants have further found, when the lead content of the first silver-enriched liquid drain product is kept in compliance with the upper limit as specified and the tin content in the same product stream is kept in compliance with the lower limit as specified, that fewer steps are necessary in the fractional crystallisation part of the process in order to obtain the desired separation and enrichment of silver from feed to drain product.

BRIEF DESCRIPTION OF THE DRAWINGS

FIG. 1 shows a flow diagram of a larger overall process comprising a preferred embodiment of the process according to the present invention.

DETAILED DESCRIPTION

The present invention will hereinafter be described in particular embodiments, and with possible reference to particular drawings, but the invention is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present invention. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present invention.

Unless specified otherwise, all ranges provided herein include up to and including the endpoints given, and the values of the constituents or components of the compositions are expressed in weight percent or % by weight of each ingredient in the composition.

As used herein, "weight percent", "% wt", "wt-%," "percent by weight," "% by weight,", "ppm wt", "ppmwt", "ppm by weight", "weight ppm" or "ppm" and variations thereof refer to the concentration of a substance as the weight of that substance divided by the total weight of the composition and multiplied by 100 or 1000000 as appropriate, unless specified differently. It is understood that, as used here, "percent", "%," are intended to be synonymous with "weight percent," "% wt," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

Additionally, each compound used herein may be discussed interchangeably with respect to its chemical formula, chemical name, abbreviation, etc. . . . .

Most of the metal streams in the process according to the present invention contain a major portion of lead, often in combination with a significant amount of tin. Such streams have a relatively low melting point and have been used, already for centuries, for attaching one solid to another solid, by a process which was often called "soldering". Such streams are therefore often addressed as being so-called "solder" streams or "solders", and this term has also been used in this document to address such streams.

From the target metals which the present invention is recovering, Sn and Pb are considered "the solder metals". These metals distinguish themselves from other metals, in particular copper and nickel, because mixtures containing major amounts of these metals usually have a much lower melting point than mixtures containing major amounts of copper and/or nickel. Such compositions have been used already millennia ago for creating a permanent bond between two metal pieces, and this by first melting the "solder", bringing it in place, and letting it solidify. The solder therefore needed to have a lower melting temperature than the metal of the pieces it was connecting. In the context of the present invention, a solder product or a solder metal composition, two terms which are used interchangeably throughout this document, mean metal compositions in which the combination of the solder metals, thus the level of Pb plus Sn, represents the major portion of the composition, i.e. at least 50% wt and preferably at least 65% wt. The solder product may further contain minor levels of the other target metals copper and/or nickel, and of non-target metals, such as Sb, As, Bi, Zn, Al and/or Fe, and/or elements such as Si.

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag or dross is given, wherein the majority of such metals may actually be present in an oxidized and/or chemically bound form. It is therefore that the composition of the metal mixture as feed to step (a) specifies the content of Fe, Zn, Pb, Cu, Sb, Bi as elemental metals. Less noble metals are more difficult to reduce under non-ferrous pyrometallurgical conditions and occur mostly in an oxidized form. These metals typically are expressed in terms of their most common oxide form. Therefore slag or dross compositions are typically giving the content of Si, Ca, Al, Na respectively expressed as $SiO_2$, $CaO$, $Al_2O_3$, $Na_2O$.

In an embodiment, the metal composition according to the present invention, which preferably is obtained as the first silver-enriched liquid drain product from the crystalliser of the process according to the present invention, comprises at least 6.5% wt of lead, preferably at least 7.0% wt, more preferably at least 8.0% wt, even more preferably at least 9.0% wt, preferably at least 10.0% wt, more preferably at least 11.0% wt, even more preferably at least 12.0% wt, preferably at least 13.0% wt, more preferably at least 14.0% wt, even more preferably at least 15.0% wt of lead. Lead is an enabling element in the upstream process that produces the metal composition according to the present invention, because the possibility to recover silver from a crude tin by means of fractional crystallization is based on the existence of a lower melting eutectic composition in the lead-tin binary phase system.

The applicants prefer to have the lead content in the metal composition according to the present invention above the lower limit as specified, because a higher lead content in the drain product of the fractional crystallisation step that produces the metal composition according to the present invention relative to the lead content in the feed to the fractional crystallisation step brings along a higher concentration factor of the silver from feed to drain product in the crystallisation step. A higher concentration factor brings the advantage of being able to process feedstocks that are more dilute in silver for the same drain product quality and/or producing a drain product more concentrated in silver for a feedstock of the same silver content.

More lead in the metal composition according to the present invention also makes the composition more suitable for the recovery of the lead, tin and antimony in the stream by means of electrolysis in combination with pyrometallurgy. More lead means also more lead in the cathodes produced in the electrolysis step discussed above. When these cathodes are submitted to a vacuum distillation step for separating the lead and antimony from the tin, and for producing a high purity tin precursor from which chemical refining may readily derive a high purity tin prime product, the lead acts as a carrier for the antimony. The lead facilitates the removal of antimony from the tin, and hence a higher level of lead is desired in the metal composition according to the present invention.

In an embodiment, the metal composition according to the present invention, which preferably is obtained as the first silver-enriched liquid drain product from the crystalliser of the process according to the present invention, comprises at most 27.5% wt, preferably at most 25.0% wt, more preferably at most 22.50% wt, preferably at most 20.0% wt, more preferably at most 17.5% wt, even more preferably at most 15.0% wt of lead. The level of lead, in combination with the level of tin, is preferably such that the metal composition, which preferably is obtained as the first silver-enriched liquid drain product from the crystalliser of the process according to the present invention, falls at the correct side of the eutectic composition in the binary Pb/Sn phase diagram, such that the tin is concentrated up in the crystal product leaving the crystallization step at the hot end and most of the lead ends up in the drain product leaving the crystallization step at the cold end, and of which the composition is closer to the eutectic composition as compared to the feed composition. The applicants have found that respecting the upper limit on lead as specified, also reduces the risk for crystal growth on the blades of the screw inside the crystalliser, because the stream composition stays further away from the eutectic composition.

In an embodiment, the metal composition according to the present invention, which preferably is obtained as the first silver-enriched liquid drain product from the crystalliser of the process according to the present invention, comprises at least 72.5% wt, preferably at least 75.0% wt, more preferably at least 77.5% wt, even more preferably at least 80.0% wt, preferably at least 81.0% wt, more preferably at least 82.0% wt, even more preferably at least 83.0% wt, preferably at least 84.0% wt, more preferably at least 85.0% wt, even more preferably at least 87.5% wt of tin. Tin is also an enabling element in the upstream process that produces the metal composition according to the present invention, which preferably is obtained as the first silver-enriched liquid drain product from the crystalliser of the process according to the present invention, because the possibility to recover silver from a crude tin by means of fractional crystallization is based on the existence of a lower melting eutectic composition in the lead-tin binary phase system. The level of tin, in combination with the level of lead, is preferably such that the metal composition, which preferably is obtained as the first silver-enriched liquid drain product from the crystalliser of the process according to the present invention, falls at the correct side of the eutectic composition in the binary Pb/Sn phase diagram, such that the tin is concentrated up in the crystal product leaving the crystallization step at the hot end and most of the lead ends up in the drain product leaving the crystallization step at the cold end, and of which the composition is closer to the eutectic composition as compared to the feed composition. The applicants have found that this setup assures that silver from the feed to the crystallizer is concentrated up in the drain product, and hence that a recovery of silver by separating silver from the tin enriched product produced by the crystallizer is achieved.

In an embodiment, the metal composition according to the present invention, which preferably is obtained as the first silver-enriched liquid drain product from the crystalliser of the process according to the present invention, comprises at most 90% wt of tin, preferably at most 89.0% wt, more preferably at most 88.0% wt, even more preferably at most 87.0% wt, preferably at most 86.0% wt, more preferably at most 85.0% wt, even more preferably at most 84.5% wt, preferably at most 84.0% wt, more preferably at most 83.0% wt, even more preferably at most 82.0% wt of tin. The applicants have found that complying with the upper limit of tin brings the advantage that there is more room for lead in the composition. Because more lead brings the advantage of the capability of having in the upstream crystalliser step a higher concentration factor for silver, the lower tin content brings the advantage of a possibly higher silver content in the metal composition according to the present invention, which preferably is obtained as the first silver-enriched liquid drain product from the crystalliser of the process according to the present invention, combined with a lower level of silver in the tin-enriched product obtained at the crystal end of the upstream crystallisation step, together meaning that more of the silver present ends up in the target product from which it may be upgraded to a commercial grade silver product. This brings the advantage that for the same amount of metal composition, more high value silver may be recovered, or that for the same amount of silver to be recovered from the metal composition according to the present invention, which preferably is obtained as the first silver-enriched liquid drain product from the crystalliser of the process according to the present invention, less volume of the metal composition needs to be processed, and less Sn/Pb by-product needs to be processed after the downstream separation of most of the tin and lead from the silver.

In an embodiment, the metal composition according to the present invention, which preferably is obtained as the first silver-enriched liquid drain product from the crystalliser of the process according to the present invention, comprises at least 95.25% wt of lead and tin together, preferably at least 95.5% wt, more preferably at least 95.75% wt, even more preferably at least 96.00% wt, preferably at least 96.25% wt, preferably at least 96.5% wt, more preferably at least 96.75% wt, even more preferably at least 97.00% wt of tin and lead together. A higher content of Sn+Pb brings the benefit that the metal composition according to the present invention may contain less of undesired elements. The applicants have found that besides the lead and tin, and the silver as target metal for recovery, also some antimony and a limited amount of arsenic may be allowable, but that a number of other elements are preferably kept at the level of trace quantities. One such element is for instance iron (Fe), because that element may be of nuisance to the working of the electrolysis step in which a silver rich anode slime may be recovered while most of the tin and lead may be made to deposit in a cathode co-product. The mechanism by which iron may affect the electrolysis is described in detail in WO 2019/219821 A1. Other elements such as nickel may also represent an extra burden in electrolysis, and also higher levels of copper may create a need for extra measures in the downstream processing of the metal composition according to the present invention and/or its derivatives. For instance, the applicants prefer that the level of copper should remain limited in the metal composition according to the present invention, which preferably is obtained as the first silver-enriched liquid drain product from the crystalliser of the process according to the present invention, because copper is believed to counter the advantageous effect brought by the presence of antimony and/or bismuth. The higher content of lead and tin together thus contributes to all these advantages.

In an embodiment, the metal composition according to the present invention, which preferably is obtained as the first silver-enriched liquid drain product from the crystalliser of the process according to the present invention, comprises at most 98.75% wt of lead and tin together, preferably at most 98.50% wt, more preferably at most 98.25% wt, even more preferably at most 98.00% wt, preferably at most 97.75% wt, more preferably at most 97.50% wt, even more preferably at most 97.25% wt, preferably at most 97.00% wt, more preferably at most 96.75% wt, even more preferably at most 96.50% wt of lead and tin together. Keeping the content of lead and tin together below the upper limit as specified brings the advantage that there is more room in the composition for the presence of the target metal silver, i.e. for its economic value, and for the elements antimony and bismuth, desired because of the positive effects that they bring as described hereinabove. Preferably the metal composition according to the present invention, which preferably is obtained as the first silver-enriched liquid drain product from the crystalliser of the process according to the present invention, contains no other metals than lead, tin, silver, bismuth, and antimony in concentrations above trace levels. For copper is 0.5% wt still a trace metal and usually an unintentional consequence of the metal composition according to the present invention being a by-product of copper refining. For the other metals, the trace level is preferably at most 0.2% wt each. More preferably the levels of elements other than lead, tin, silver, bismuth, antimony, copper, arsenic and indium are at most 0.05% wt each.

In an embodiment, the metal composition according to the present invention, which preferably is obtained as the first silver-enriched liquid drain product from the crystalliser of the process according to the present invention, comprises at least 0.90% wt of silver, preferably at least 1.00% wt, more preferably at least 1.25% wt, even more preferably at least 1.50% wt, preferably at least 1.60% wt of, preferably at least 1.70% wt, more preferably at least 1.75% wt, even more preferably at least 2.00% wt of silver. Silver is the target metal in the first silver-enriched liquid drain product from the crystalliser, which may also be the metal composition according to the present invention. It is the element having the higher market value as compared to the other metals discussed in this context in this document. A higher level of silver brings the advantage of a higher economic interest in the metal composition.

In an embodiment, the metal composition according to the present invention, which preferably is obtained as the first silver-enriched liquid drain product from the crystalliser of the process according to the present invention, comprises at most 4.50% wt of silver, preferably at most 4.00% wt, more preferably at most 3.50% wt, even more preferably at most 3.00% wt, preferably at most 2.75% wt, more preferably at most 2.50% wt, even more preferably at most 2.25% wt preferably at most 2.00% wt, more preferably at most 1.75% wt, even more preferably at most 1.50% wt of silver. The applicants prefer to comply with this upper limit for silver, because that leaves room for complying with the lower limit prescribed above on lead and tin together, and hence opens the capability to bring the effects associated therewith.

In an embodiment, the metal composition according to the present invention, which preferably is obtained as the first silver-enriched liquid drain product from the crystalliser of the process according to the present invention, comprises at least 0.25% wt of antimony, preferably at least 0.30% wt, more preferably at least 0.35% wt, even more preferably at least 0.40% wt, preferably at least 0.45% wt of, preferably at least 0.50% wt, more preferably at least 0.55% wt, even more preferably at least 0.60% wt of antimony. The advantages brought by antimony in the metal composition according to the present invention are discussed above in this document. A higher level of antimony enhances these effects. An extra advantage is that the cathodes obtained in the downstream electrolysis step performed on the metal composition according to the present invention, which preferably is obtained as the first silver-enriched liquid drain product from the crystalliser of the process according to the present invention, may readily be introduced in a process for the recovery of high purity tin prime product together with a hard lead prime product, because the hard lead prime product allows for a significant level of antimony, and because the antimony is a strong contributor to the desired properties of the hard lead prime product, as compared to higher purity soft lead prime products. The applicants have found, for bringing the level of antimony further up in the anodes that are to be cast from the metal composition according to the present invention, which preferably is obtained as the first silver-enriched liquid drain product from the crystalliser of the process according to the present invention, that this may readily be achieved by introducing a small amount of Pb/Sb concentrate, such as for instance a small amount of the hard lead prime product obtained downstream from the process according to the present invention. The applicants have found that in that way readily the level of antimony (together with bismuth), which is most preferred for excellent electrolysis operations, in the anodes that are cast from the metal composition according to the present invention may be obtained. The applicants prefer that the level of antimony plus bismuth in those anodes is at least 1.0% by weight, and optionally at most 1.5% by weight.

In an embodiment, the metal composition according to the present invention, which preferably is obtained as the first silver-enriched liquid drain product from the crystalliser of the process according to the present invention, comprises at most 4.00% wt or even at most 3.50% wt of antimony, preferably at most 3.00% wt, more preferably at most 2.50% wt, even more preferably at most 2.00% wt, preferably at most 1.75% wt, more preferably at most 1.50% wt, even more preferably at most 1.25% wt preferably at most 1.00% wt, more preferably at most 0.75% wt of antimony. This brings the advantage in the downstream electrolysis step that antimony does not dissolve into the electrolyte but remains in the anode slime and contributes to a stronger adherence of the anode slime to the anodes, such that the anode slime is recoverable by simple mechanical scraping off from the used anode. Another advantage of less antimony is that the anode slime is more concentrated in the target metal silver, and hence is more suitable for the upgrade of the silver into a commercial grade silver prime product.

In an embodiment, the metal composition according to the present invention, which preferably is obtained as the first silver-enriched liquid drain product from the crystalliser of the process according to the present invention, is a molten liquid. This brings the advantage that the composition does not need to be melted again before it may be cast into anodes for the electrolysis step described above in this document and in which Sn/Pb cathodes may be formed and the silver may be recovered in a higher concentration as part of anode slimes formed in the electrolysis cell.

In an embodiment, the metal composition according to the present invention, which preferably is obtained as the first silver-enriched liquid drain product from the crystalliser of the process according to the present invention, comprises at least 0.05% wt and at most 0.5% wt of arsenic, preferably at least 0.06% wt, more preferably at least 0.07% wt, even more preferably at least 0.08% wt, preferably at least 0.09% wt of, preferably at least 0.10% wt, more preferably at least 0.11% wt, even more preferably at least 0.12% wt of arsenic, and optionally at most 0.45% wt of arsenic, preferably at most 0.40% wt, more preferably at most 0.35% wt, even more preferably at most 0.30% wt, preferably at most 0.25% wt, more preferably at most 0.200% wt, even more preferably at most 0.175% wt preferably at most 0.150% wt, more preferably at most 0.125% wt of arsenic. The applicants have found that limited levels of arsenic are allowed in the further processing of the metal composition according to the present invention. Allowing arsenic in the metal composition according to the present invention, which preferably is obtained as the first silver-enriched liquid drain product from the crystalliser of the process according to the present invention, relaxes and widens the acceptance criteria for the upstream processes from which the metal composition is obtained. In the downstream electrolysis of anodes that are cast with the metal composition according to the present invention, optionally with some added Pb/Sb concentrate as discussed above, most of the arsenic will tend to stay with the anode slime and be removed from the process as part thereof. The applicants prefer the arsenic to stay below the upper limit as specified, because that causes less dilution of the silver in the anode slime and makes this anode slime more suitable for the upgrade of its silver content into a commercial grade silver prime product.

In an embodiment, the metal composition according to the present invention, which preferably is obtained as the first silver-enriched liquid drain product from the crystalliser of the process according to the present invention, further comprises at least 0.05% wt and at most 0.6% wt of copper, preferably at least 0.07% wt, more preferably at least 0.10% wt, even more preferably at least 0.12% wt, preferably at least 0.15% wt of copper, preferably at least 0.20% wt, more preferably at least 0.25% wt, even more preferably at least 0.30% wt of copper, and optionally at most 0.55% wt of copper, preferably at most 0.50% wt, more preferably at most 0.48% wt, even more preferably at most 0.45% wt, preferably at most 0.40% wt, more preferably at most 0.350% wt, even more preferably at most 0.325% wt preferably at most 0.300% wt, more preferably at most 0.250% wt of copper. Allowing copper in the metal composition according to the present invention, which preferably is obtained as the first silver-enriched liquid drain product from the crystalliser of the process according to the present invention, brings the advantage that the upstream process producing the composition may accept feed streams containing copper, such as by-products of copper refining. The upstream process producing the metal composition according to the present invention is preferably part of an overall process including the production of refined copper, refined tin and refined lead, and the metal composition according to the present invention is preferably a by-product from such a process intended for the recovery of silver entering the overall process. The applicants however prefer to limit the presence of copper in the metal composition according to the present invention because the copper increases the burden in the downstream process steps. For instance, excessive presence of copper is believed to counter the benefits described above of having antimony (and bismuth) in the metal composition according to the present invention, If the copper content upstream of the metal composition according to the present invention is above the prescribed upper limit, some of the copper may be removed by adding sulphur, which generates a dross containing copper sulphides that may readily be skimmed off and recycled into an upstream pyrometallurgical process step, and which may leave a composition compliant with all the conditions specified for the metal composition according to the present invention.

In an embodiment, the metal composition according to the present invention, which preferably is obtained as the first silver-enriched liquid drain product from the crystalliser of the process according to the present invention, comprises at least 0.0030% wt and at most 0.0500% wt of nickel, preferably at least 0.0050% wt, more preferably at least 0.0075% wt, even more preferably at least 0.0100% wt, preferably at least 0.0125% wt of, preferably at least 0.0150% wt, more preferably at least 0.0175% wt, even more preferably at least 0.0200% wt of nickel, and optionally at most 0.0450% wt of nickel, preferably at most 0.0400% wt, more preferably at most 0.0350% wt, even more preferably at most 0.0325% wt, preferably at most 0.0300% wt, more preferably at most 0.0275% wt, even more preferably at most 0.0250% wt preferably at most 0.0225% wt, more preferably at most 0.0200% wt of nickel. The applicants prefer to allow a limited amount of nickel in the metal composition according to the present invention, which preferably is obtained as the first silver-enriched liquid drain product from the crystalliser of the process according to the present invention, because that allows the process producing the composition to accept feeds that contain nickel, such as co-products from copper refining and/or nickel refining. The presence of nickel is preferably limited in order not to create excessive burden in the downstream processing of the metal composition, such as the electrolysis step, in which the nickel will tend to become dissolved in the electrolyte but not deposited on the cathode. This may lead to a build-up of nickel in the electrolyte, which may need to be controlled by providing an electrolyte bleed stream from the electrolysis step, such as described in WO 2019/219821 A1.

In an embodiment, the metal composition according to the present invention, which preferably is obtained as the first silver-enriched liquid drain product from the crystalliser of the process according to the present invention, comprises at least 0.0010% wt and at most 0.40% wt of bismuth, preferably at least 0.0020% wt, more preferably at least 0.0030% wt, even more preferably at least 0.0040% wt, preferably at least 0.0060% wt of, preferably at least 0.0070% wt, more preferably at least 0.0085% wt, even more preferably at least 0.0100% wt of bismuth, and optionally at most 0.30% wt of bismuth, preferably at most 0.200% wt, more preferably at most 0.150% wt, even more preferably at most 0.1000% wt, preferably at most 0.0750% wt, more preferably at most 0.0500% wt, even more preferably at most 0.0400% wt preferably at most 0.0300% wt, more preferably at most 0.0250% wt of bismuth. The applicants have found that limited amounts of bismuth are allowable, meaning that the upstream process may accept feeds containing bismuth. The applicants have further found that bismuth is also desired in the metal composition according to the present invention, which preferably is obtained as the first silver-enriched liquid drain product from the crystalliser of the process according to the present invention, because it is believed to contribute to the advantageous effect brought by antimony when the metal composition according to the present invention is used as feed for the electrolysis step as described above. The applicants prefer to comply with the upper limit as specified, because the bismuth stays in the anode slime and less bismuth thus brings the advantage of anode slime that is more concentrated in its target metal silver making this anode slime more suitable for the upgrade of its silver content into a commercial grade silver prime product.

The applicants have also found that bismuth may end up in the tin prime product derived from the metal composition, which preferably is obtained as the first silver-enriched liquid drain product from the crystalliser of the process according to the present invention, in which limited levels are acceptable. In addition, the small amount of bismuth present in the final tin product brings the advantage of reducing the temperature at which a phenomenon called the "tin pest" is able to occur. Tin pest is an autocatalytic conversion at sufficiently low temperatures of the white beta-form of continuous solid tin into the grey alfa-tin powder which may give the white tin surface a grey dull aspect and possibly, because of the autocatalytic nature of the conversion, even may lead to physical disintegration of the tin metal object into a grey powder.

In an embodiment, the metal composition according to the present invention, which preferably is obtained as the first silver-enriched liquid drain product from the crystalliser of the process according to the present invention, comprises at most 1.0% wt of iron, preferably at most 0.1% wt, more preferably at most 0.01% wt, even more preferably at most 0.0050% wt, yet more preferably at most 0.0010% wt of iron.

The applicants have found that there is a significant advantage in limiting the iron content as specified for when the metal composition according to the present invention, which preferably is obtained as the first silver-enriched liquid drain product from the crystalliser of the process according to the present invention, is used for casting anodes as feed for the electrolysis step discussed hereinabove. The applicants have found that dissolved iron in the electrolyte of such step brings significant energy inefficiencies in that they cause part of the electrical current through the cell to not contribute to the transfer of lead and tin cations from anode to cathode. Without wanting to be bound by this theory, the applicants believe that iron cations in the electrolyte are readily able to change valence (a.k.a. valency), presumably by the half-reaction $Fe^{2+} \rightarrow Fe^{3+} + e^-$ occurring at the anode, and after the $Fe^{3+}$ cation having moved to the cathode, the reversed half-reaction $Fe^{3+} + e^- \rightarrow Fe^{2+}$ at the cathode, upon which the $Fe^{2+}$ cation is able to return to the anode. This mechanism could explain the observation, with significant amounts of iron in the electrolyte, that a part of the electrical current may pass through the cell without contributing to the transfer of lead and/or tin cations.

The applicants have also found that an extra but non-contributing electrical current is needed to maintain equal cathode productivity due to iron in the anodes, and hence also in the electrolyte. The increased current causes the voltage over the cell to increase, and also to rise faster, which results in increased levels of contaminants in the cathode and leads to reaching the maximum allowable level faster. The higher current also generates more heat in the cell, and possibly hotspots, which causes other problems. It also forces the current density up higher for the same productivity, which raises its contribution to cathode contamination. More details about the problems generated by the presence of iron are described in WO 2019/219821 A1.

Iron, when it dissolves from the anode into the electrolyte, increases the density and the viscosity of the electrolyte, which affects the mass and heat transfer mechanisms in the electrolytic cell, for instance the movement of the target cations on their way to the cathode. High Fe content in the anode, and thus also in the electrolyte, raises the resistance that these target cations need to overcome on their way to the cathode.

It is for this reason that the metal composition according to the present invention should comprise iron at a level that is below the prescribed upper limit.

In an embodiment, the metal composition according to the present invention, which preferably is obtained as the first silver-enriched liquid drain product from the crystalliser of the process according to the present invention, comprises at least 0.0005% wt of gold, preferably at least 0.0010% wt, more preferably at least 0.0020% wt, even more preferably at least 0.0030% wt, preferably at least 0.0040% wt of gold, more preferably at least 0.0050% wt, even more preferably at least 0.0060% wt, yet more preferably at least 0.0070% wt, preferably at least 0.0080% wt of, more preferably at least 0.0085% wt, even more preferably at least 0.0090% wt, yet more preferably at least 0.0100% wt of gold, and optionally at most 0.0500% wt, preferably at most 0.0250% wt, more preferably at most 0.0200% wt, even more preferably at most 0.0175% wt of gold. The applicants have found that gold present in small amounts in the pyrometallurgical processing of non-ferrous metals may concentrate in the drain from a fractional crystallisation step as described as part of the process according to the present invention, and hence may be present in the metal composition according to the present invention, which preferably is obtained as the first silver-enriched liquid drain product from the crystalliser of the process according to the present invention. Gold is a precious metal and may be recovered together with silver and other precious metals that may be present in the composition, particularly as part of the anode slime forming in the electrolysis step wherein the composition may be processed as a feed.

In an embodiment of the process according to the present invention, the amount of lead in the crude tin mixture as feed to the crystallisation step is at least 0.15% wt, preferably at least 0.20% wt, more preferably at least 0.30% wt, even more preferably at least 0.40% wt, yet more preferably at least 0.50% wt, preferably at least 0.60% wt, more preferably at least 0.70% wt, even more preferably at least 0.80% wt, preferably at least 0.90% wt and more preferably at least 1.00% wt. The lead is an enabler to the fractional crystallisation step, and acts as a solvent for the silver that the step wants to remove from the main stream of crude tin. The silver prefers to stay with most of the lead and to end up in the drain, and the composition of the drain is approaching the eutectic composition of 38.1% wt/61.9% wt Pb/Sn. Respecting this lower limit for the presence of Pb favours the operability of the fractional crystallisation step, e.g. in that it assures sufficient liquid phase in the crystalliser stages where a good and intimate contact between liquid and crystals is desired for obtaining an efficient separation.

In an embodiment of the process according to the present invention, the amount of tin in the crude tin mixture as feed to the crystallisation step is at least 65% wt, preferably at least 70% wt, more preferably at least 80% wt, even more preferably at least 90% wt, preferably at least 92% wt and more preferably at least 92.0% wt. Respecting this lower limit assures that the crystalliser operates at the correct side of the eutectic composition between lead and tin. This assures that a drain is obtained with a composition that approaches the eutectic composition and that most of the lead, and hence of the silver, is retrieved in the drain product from the crystallisation step and not at the crystal end.

In an embodiment of the process according to the present invention the crude tin mixture comprises at most 6.5% wt of Pb, preferably at most 6.0% wt, more preferably at most 5.5% wt. even more preferably at most 5.25% wt, preferably at most 5.00% wt, more preferably at most 4.90% wt. even more preferably at most 4.80% wt, preferably at most 4.00% wt, more preferably at most 3.00% wt. even more preferably at most 2.00% wt of Pb, preferably at most 1.50% wt of Pb. With lower amounts of lead in the crude tin mixture feed to the crystalliser step, the applicants have found that the volume of drain by-product may be kept lower and the concentration of silver in the drain may be kept higher. This brings the advantage that there may be recovered silver from more dilute feedstocks, while at the same time producing a drain that is sufficiently high in silver to allow an effective and efficient recovery of the silver thereof. The lower volume and higher silver content of the drain are also to the benefit of the efficiency and effectiveness of the process steps for the recovery of the silver from the drain.

In an embodiment of the process according to the present invention the lead concentration in the crude tin mixture is at least 3.0 times the silver concentration in the crude tin mixture, preferably at least 4.0, more preferably at least 5.0, even more preferably at least 6.0, and yet more preferably at least 7.0 times the silver concentration in the crude tin mixture. The applicants have found that respecting this lower limit for the ratio of lead to silver concentration avoids that the drain composition approaches an eutectic composition in the ternary diagram of lead/tin/silver.

In an embodiment of the process according to the present invention the crude tin mixture comprises at least 10 ppm wt of silver (Ag), preferably at least 20 ppm wt, more preferably at least 25 ppm wt, even more preferably at least 30 ppm wt, yet more preferably at least 50 ppm wt, preferably at least 100 ppm wt, more preferably at least 200 ppm wt, even more preferably at least 300 ppm wt, yet more preferably at least 500 ppm wt, preferably at least 750 ppm wt, more preferably at least 1000 ppm wt, even more preferably at least 1100 ppm wt, yet more preferably at least 1200 ppm wt of silver, and optionally at most 0.85% wt of silver, preferably at most 0.80% wt, more preferably at most 0.75% wt, even more preferably at most 0.70% wt, yet more preferably at most 0.65% wt, preferably at most 0.60% wt, more preferably at most 0.55% wt, even more preferably at most 0.50% wt, yet more preferably at most 0.45% wt, preferably at most 0.40% wt, more preferably at most 0.35% wt, even more preferably at most 0.30% wt, yet more preferably at most 0.25% wt, preferably at most 0.20% wt, more preferably at most 0.175% wt or at most 1750 ppm wt, even more preferably at most 1600 ppm wt, yet more preferably at most 1500 ppm wt. A higher silver content in the crude tin mixture as feed to the crystallisation step brings the benefit that more silver is available for being recovered, and that the drain from the crystalliser may contain more silver, and hence not only represent a higher economic value but from which the recovery of silver may be made more efficiently and more effectively. Respecting the upper limit for the silver content brings the advantage that the drain composition runs a lower risk for approaching the eutectic composition in the ternary diagram for Pb/Sn/Ag. The upper limit on the silver in the crude tin mixture also brings the advantage that it allows a significant concentration increase from feed to drain of the crystalliser, such that the process is able to accept feedstocks that are lower in silver content, i.e. which may be very dilute in Ag.

In an embodiment of the process according to the present invention the crude tin mixture comprises at least 0.1% wt of antimony (Sb), preferably at least 0.2% wt, more preferably at least 0.5% wt, even more preferably at least 1.0% wt, preferably at least 1.2% wt, more preferably at least 1.5% wt, even more preferably at least 2.0% wt of antimony, and optionally at most 6.0% wt of antimony, preferably at most 5.0% wt, more preferably at most 4.0% wt of antimony. This brings the advantage that the process according to the present invention, and also the upstream processes that produce the crude tin mixture as feed for the crystallisation step enjoy a wider flexibility for accepting raw materials. The applicants have further found that most of the antimony prefers to stay with the tin in the crystallisation step, and the presence of antimony brings the advantage that it increases the melting point of the crystals that are formed, which facilitates the separations in the crystalliser and causes a clearer separation between the Pb/Ag in the drain and the Sn/Sb in the crystals.

In an embodiment of the process according to the present invention the first tin-enriched product comprises at least 0.05% wt of lead, preferably at least 0.10% wt, more preferably at least 0.15% wt, even more preferably at least 0.20% wt of lead. This brings the advantage that this stream is more suitable as feed for a distillation step in which lead and antimony may be removed by evaporation from the main tin stream, and in which the more volatile lead facilitates the evaporation of antimony by diluting the vapour phase in the distillation step. The lead thus acts as a kind of carrier for the antimony. The applicants have found, as shall be shown elsewhere in this document, that the lead, in combination with the antimony and after the downstream distillation step, provides for an overhead product that is suitable for deriving a hard lead prime product therefrom.

In an embodiment of the process according to the present invention the first tin-enriched product is produced in continuous mode. This brings the advantage that the quality of the first tin-enriched product is more constant and stable in time, and that the downstream steps in which this product is further processed may be operated more effectively and more efficiently.

In an embodiment of the process according to the present invention the entire fractional crystallisation step is operated in continuous mode. This brings the advantage that the quality of the products form the fractional crystallisation step is more constant and stable in time, such that the further processing of these products may be operated more effectively and more efficiently.

In an embodiment of the process according to the present invention the first silver-enriched liquid drain product is recycled, partially and/or temporarily, to the feed of the fractional crystallisation step. This brings the advantage that the enrichment factor for the silver, i.e. the concentration ratio of silver concentration in the net drain product removed from the process relative to the silver concentration in the fresh feed to the process, is further increased. This brings the already explained benefits of (i) making feedstocks that are more dilute in silver acceptable for the process according to the present invention, and (ii) making the further processing of the drain more efficient and effective.

In an embodiment of the process according to the present invention the fractional crystallisation step comprises at least 4 crystalliser stages, preferably at least 8, more preferably at least 10, even more preferably at least 12, yet more preferably at least 16, preferably at least 20, more preferably at least 24 crystalliser stages. This brings the advantage that the crystalliser is able to achieve a clearer separation between the Pb/Ag in the drain and the Sn/Sb in the crystals. This further brings the advantage of a higher enrichment in silver between feed and drain composition, with the associated benefits explained elsewhere in this document.

In an embodiment of the process according to the present invention the crystalliser used in the fractional crystallisation step comprises a feed stage for accepting the feed to the crystalliser and the crystalliser further comprises at least one crystalliser stage and preferably at least 2 stages between the feed stage and each one of the product outlets of the crystalliser. This brings the advantage that the compositions of both products differ more from the feed composition. It brings the further advantage of a higher operational flexibility. A further advantage is that this facilitates the control of the temperature profile through the crystallisation step, which further brings a clearer separation.

In an embodiment of the process according to the present invention the temperature profile through the stages of the fractional crystallisation step is in the range of 180-270° C. The applicants have found that this temperature range is sufficient to achieve the desired separation between the Pb/Ag in the drain and the Sn and optionally Sb in the crystal end product of the crystallisation step. Preferably the minimum temperature in the crystalliser is at least 183° C., more preferably at least 185° C., even more preferably at least 187° C., yet more preferably at least 190° C., preferably at least 193° C., more preferably at least 196° C. Optionally the maximum temperature in the crystalliser is at most 265° C., preferably at most 260° C. and more preferably at most 255° C. These temperature prescriptions bring the benefit of lower temperature differences throughout the crystalliser, such that less heating and/or cooling needs to be provided.

In an embodiment of the process according to the present invention the temperature difference between two adjacent stages in the fractional crystallisation step not including a feed stage nor an end stage is at most 20° C., preferably at most 15° C., more preferably at most 10° C. This brings the benefit that less cooling and/or heating needs to be provided, such that less heat exchange surface needs to be provided, while also the quality of the separation is improved.

In an embodiment of the process according to the present invention the fractional crystallisation step is performed in at least 2 crystallisers in series, whereby the product from the crystal end of the upstream crystalliser is fed to the downstream crystalliser, either entirely to the feed stage of the downstream crystalliser or only a first portion thereof being fed to the feed stage of the downstream crystalliser and a second portion thereof being fed to a second stage of the downstream crystalliser different from the feed stage, that second stage being chosen from the stages located between the feed stage and the end stage at the crystal end of the downstream crystalliser, preferably the second stage being separated from the feed stage by at least one and preferably two or three intermediate stages. The applicants have found that this setup is highly convenient and is able to achieve a better separation. In addition, this setup offers extra flexibility for choosing where to route intermediate streams and/or recycle streams.

In an embodiment of the process according to the present invention the product from the liquid end of the downstream crystalliser is at least partially and preferably entirely, at least temporarily returned to the upstream crystalliser, optionally to the feed stage but preferably to a second stage which is chosen from the stages located between the feed stage and the end stage at the crystal end of the upstream crystalliser, preferably the second stage being separated from the end stage by at least one and preferably two or three intermediate stages. This brings the advantage that less lead may accumulate in the downstream crystalliser due to possible entrainment of lead that has been returned with the drain recycle from the downstream crystalliser to the upstream crystalliser and wetting the crystal product from the upstream crystalliser being fed to the downstream crystalliser.

In an embodiment of the process according to the present invention the crude tin mixture further comprises at least 1 ppm wt of at least one metal selected from copper, iron, bismuth, nickel, zinc, gold, indium and arsenic. The presence of traces of copper and iron are a strong indicator that the crude tin mixture is obtained as a by-product from the production of copper by a pyrometallurgical process. The allowance of small amounts of the listed metals offers feedstock flexibility for the upstream processes providing the crude tin mixture as feedstock for the crystallisation step. The applicants have found that many of the listed metals have a tendency to at least partially end up in the drain, sometimes even to concentrate into the drain, and hence are at least partially removed from the main tin stream, from which then more readily a high purity tin prime product may be derived.

In an embodiment of the process according to the present invention the crude tin mixture comprises at least 99.0% wt together of tin, lead, antimony and silver, preferably at least 99.1% wt, more preferably at least 99.2% wt, even more preferably at least 99.3% wt, yet more preferably at least 99.4% wt, preferably at least 99.5% wt, more preferably at least 99.6% wt, even more preferably at least 99.7% wt together of tin, lead, antimony and silver. This brings the advantage that the crude tin mixture contains less of other materials, which may possibly represent a burden for the further processing of the crystalliser products and/or may represent a contaminant in at least one of the prime products that may be derived therefrom.

In an embodiment of the process according to the present invention the crude tin mixture is at least partially obtained as the first bottom product from a first distillation step wherein lead (Pb) is removed from a molten solder mixture by evaporation, thereby obtaining as overhead product a first concentrated lead stream. The applicants have found that the feed to the crystalliser may very conveniently be obtained as bottom product from a vacuum distillation of a solder mixture, from which the distillation removes most of the lead by evaporation. The applicants prefer to perform this first distillation step as described in WO 2018/060202 A1. In an embodiment of the process according to the present invention, a suitable fresh feed is also added as extra feed to the crystalliser step.

In an embodiment of the process according to the present invention at least one product from the liquid end of at least one crystalliser in the fractional crystallisation step is at least partially returned to the feed of the first distillation step, preferably the liquid drain from the crystalliser arranged most upstream relative to the flow of tin through the fractional crystallisation step. The applicants have found that this brings an extra capability for reducing the presence of lead in the fractional crystallisation step, such that the amount of net drain to be removed from the process for the recovery of silver may be reduced, and its silver concentration may be further increased. In addition, this recycle broadens the feedstock acceptance to materials that are lower in silver content.

In an embodiment of the process according to the present invention the first bottom product of the first distillation step comprises at least 0.1% wt of lead, preferably at least 0.15% wt or even at least 0.20% wt, more preferably at least 0.30% wt, even more preferably at least 0.40% wt, yet more preferably at least 0.50% wt, preferably at least 0.60% wt, more preferably at least 0.70% wt, even more preferably at least 0.80% wt, preferably at least 0.90% wt and more preferably at least 1.00% wt. This brings the advantage that the first bottom product is even more suitable as feed for the fractional crystallisation step, and in compliance with desired features described elsewhere for the feedstock to the fractional crystallisation step.

In an embodiment of the process according to the present invention the first silver-enriched liquid drain product is subjected to a fourth distillation step wherein lead is removed by evaporation into a fourth concentrate lead stream as distillation overhead product, thereby producing a fourth distillation bottom product. The applicants have found that the first silver-enriched liquid drain product may readily be concentrated further by removing most of its lead by vacuum distillation. The applicants have found that this vacuum distillation may readily be performed in batch mode, which is convenient if the volume of feed is limited. The applicants have further found that the overhead condensate from this fourth vacuum distillation may be made of a suitable quality comparable to the first concentrated lead stream obtained in the first distillation step, and may be mixed therewith and further processed together to obtain a soft lead prime product, as explained elsewhere in this document. The applicants have found that by this fourth distillation step the silver concentration in the fourth bottom product may be significantly higher than the silver level in the feed to the fourth distillation step.

In an embodiment of the process according to the present invention the fourth distillation bottom product is subjected to a fractional crystallisation step which produces a second silver-enriched drain product at the liquid end and a second tin-enriched product at the crystal end.

The applicants find it convenient to not only reduce the lead but also the tin level in the silver-containing stream before this is subjected to further processing for recovery of the silver. The applicants have found that another crystallisation step is highly appropriate, in that it is able to remove most of the tin in the second tin-enriched product at the crystal end, while remaining with a much smaller volume of second silver-enriched drain product for being further processed for silver recovery. The second tin-enriched product may still contain a small amount of lead, and is suitable for being mixed into the crude tin mixture as feed to the fractional crystallization step leading to the first tin-enriched product.

In an embodiment of the process according to the present invention the first silver-enriched liquid drain product or the second silver-enriched liquid drain product is used as feed for being cast into at least one anode which is subjected to an electrorefining step for obtaining a cathode product rich in lead plus tin, and an anode slime rich in silver, preferably the anode slime adhering to the used anode and being removed therefrom by mechanical means. The applicants have found that this step is very convenient for obtaining a stream in which the silver ends up in a further concentrated form, i.e. the anode slime obtained from this electrorefining step, containing readily about 20% wt of silver, and which qualifies as a silver-containing prime product. The applicants submit that the techniques for this electrorefining step are known in the art, such as using an electrolyte based on hexafluorosilicic acid ($H_2SiF_6$), fluoroboric acid and/or phenyl sulphonic acid; a temperature of about 35-40° C.; a current density in the range of 140-200 $A/m^{2,}$ and an electrode spacing of about 100 mm. The applicants further submit that the electrolysis step is particularly advantageous when the anode slime is made to adhere to the used anode, such that the used anode may be pulled from the bath and the anode slime may be removed from the used anode by mechanical means, such as by scraping off.

In an embodiment of the process according to the present invention the at least one anode used in the electrorefining step for obtaining a cathode product rich in lead plus tin comprises at least 0.5% wt of antimony, preferably at least 1.0% wt and more preferably at least 1.5% wt of antimony. The applicants have found that this presence of antimony brings the advantage that the anode slime remains adhered to the anode rather than disperses in the electrolyte. This facilitates the recovery of the anode slime. The applicants have found that the preferred level of antimony may readily be achieved, if there is insufficient antimony in the stream intended for being cast into anodes, by adding to the stream a suitable amount of Pb/Sb concentrate, such as an amount of the hard lead prime product that is obtained as one of the final prime products from the overall process comprising the process according to the present invention as described.

In an embodiment of the process according to the present invention the molten solder mixture which is fed to the first distillation step is obtained by pre-treating a crude solder composition containing at least 90% wt of tin and lead together. The applicants have found that such crude solder compositions are readily available, e.g. as by-product from the pyrometallurgical winning of copper, such as from secondary feedstocks. The applicants prefer to perform this pre-treatment as described in WO 2018/060202 A1.

In an embodiment of the process according to the present invention the crude solder composition comprises at least 0.16% wt and optionally at most 10% wt of the total of chromium (Cr), manganese (Mn), vanadium (V), titanium (Ti), tungsten (W), copper (Cu), nickel (Ni), iron (Fe), aluminium (Al) and/or zinc (Zn), and wherein the pre-treatment is comprising the step of cooling the crude solder composition down to a temperature of at most 825° C. to produce a bath containing a first supernatant dross which by gravity becomes floating upon a first liquid molten metal phase. This step brings the advantage of removing a major portion of copper that may be present in the crude solder composition.

In an embodiment of the process according to the present invention further comprises the step of adding a compound selected from an alkali metal and/or an earth alkali metal, or a chemical compound comprising an alkali metal and/or an earth alkali metal, to the first liquid molten metal phase to form a bath containing a second supernatant dross which by gravity comes floating on top of a second liquid molten metal phase, and removing the second supernatant dross from the second liquid molten metal phase to obtain the molten solder mixture. This step brings the advantage of removing most of the zinc that may be present in the crude solder composition.

In an embodiment of the process according to the present invention further comprises the step of removing the first supernatant dross from the first liquid molten metal phase. This dross may readily be recycled to a suitable pyrometallurgical process step upstream, such that its metal values may be recovered.

In an embodiment of the process according to the present invention at least one product from the liquid end of at least one crystalliser in the fractional crystallisation step is at least partially returned to the feed of the crude solder pre-treatment step. This brings the advantage that the concentration of copper in the process according to the present invention, which may have increased due to leakage of copper into the feed of the first distillation step and may have found its way into the fractional crystallisation step, is reduced again because the copper in the recycle is offered a chance to leave with the first and/or the second supernatant dross separated off in the crude solder pre-treatment step.

In an embodiment of the process according to the present invention the process for obtaining the crude solder composition comprises a metal smelting step and at least one of the first and/or the second supernatant dross is recycled to the smelting step, preferably both of the drosses are recycled to the smelting step. This brings the advantage that the metal values of interest, such as Cu, Ni and/or Zn, but also entrained Sn, Pb, Sb and/or Ag may be recovered and upgraded into an appropriate prime product.

In an embodiment of the process according to the present invention the molten solder mixture which is fed to the first distillation step comprises, on a dry weight basis,
more lead than tin,
at most 0.1% of the total of chromium (Cr), manganese (Mn), vanadium (V), titanium (Ti) and tungsten (W),
at most 0.1% of aluminium (Al)
at most 0.1% of nickel (Ni)
at most 0.1% of iron (Fe), and
at most 0.1% of zinc (Zn).

This brings the advantages that (i) the pre-treatment process is facilitated because the main solder stream has a high liquid density which helps in obtaining a clear separation between any supernatant dross and the liquid phase underneath, and (ii) that the first distillation step is able to operate flawlessly, i.e. with little risk for solid intermetallic compounds forming during the distillation, depositing on the equipment internals and impairing the flow of fluids through the distillation equipment.

In an embodiment of the process according to the present invention the molten solder mixture which is fed to the first distillation step comprises, on a dry weight basis, at least 1 ppm wt and at most 5000 ppm wt of copper.

The inventors have further found that the possibly harmful metals, and in particular copper, do not need to be removed entirely from the solder mixture in order to make the solder mixture suitable for vacuum distillation. The inventors have for instance found that the identified problems may be reduced to a practically and economically acceptable level when small amounts of copper remain present in the solder feed to the first distillation step. This finding brings the advantage that solder streams may be processed which occur as the by-product from the recovery of copper from primary and/or secondary feedstocks, in particular from secondary feedstocks, even more importantly from feedstocks containing end-of-life materials.

In an embodiment of the present invention, the molten solder mixture which is fed to the first distillation step comprises at least 0.0001% wt of sulphur (S). The applicants have also found that it is not required to bring the levels of sulphur down to very low levels, such as below the detection limit of 1 ppm wt. On the contrary the presence of sulphur in the metal mixture brings a technical benefit.

The applicants have found that sulphur quite readily binds with copper to form a copper sulphide (such as CuS), and that the copper sulphide readily separates by gravity from the liquid metal mixture containing the two main components in the process, i.e. tin and lead. The presence of sulphur is therefore able to contribute in the removal of Cu in every process step which intends or happens to separate Cu in a supernatant dross.

The presence of sulphur in the metal mixture according to the present invention, is therefore a strong indicator that the metal mixture according to the present invention has been produced as a by-product from a copper production process. As a result, the feed for the first distillation step may likely contain measurable amounts of copper as an impurity, such as the level that is specified. The copper content of such starting streams may be reduced by a variety of possible process steps, of which the binding of Cu by S is only one. Any S-treatment for the removal of Cu is very likely to leave measurable traces of S in the metal mixture. The presence of S in the metal mixture according to the present invention therefore provides a strong relation to the metal mixture having been produced as a by-product from copper production, preferably involving a step comprising the treatment with sulphur or a suitable S-containing compound.

The applicants have further found that the presence of sulphur in the feed to the first distillation step is of no nuisance provided there is also some copper present, as is specified. The S presence is able to contribute in subsequent clean-up steps to remove Cu from the less noble metal streams, in their path to reach an industrially acceptable quality.

The S in the metal mixture according to the present invention is therefore a preferred presence, with advantageous benefits showing up downstream.

In an embodiment of the process according to the present invention the fourth concentrated lead stream obtained as overhead product from the fourth distillation step is combined with the first concentrated lead stream to obtain a fifth concentrated lead stream. The applicants have found that the fourth concentrated lead stream, recovered from processing the liquid drain from the fractional crystallisation step, may readily be combined with the first concentrated lead stream obtained as overhead from the first distillation step, and may lead to a higher yield of soft lead prime product without much extra effort.

In an embodiment, the process according to the present invention further comprises the step of removing at least one contaminant selected from the metals arsenic, tin and antimony from a concentrated lead stream selected from the first concentrated lead stream, the fourth concentrated lead stream and the fifth concentrated lead stream to obtain a purified soft lead prime product. The applicants have found that any one of the listed concentrated lead streams is highly suitable for obtaining, by a limited number of chemical refining steps, a limited consumption of chemicals and limited burden for reprocessing any by-products, soft lead prime products that comply with requirements of important end-uses for such products. The applicants have found that, using means known in the art, a soft lead prime product may be derived from the any one of the first, the fourth and the fifth concentrated lead streams by removing arsenic, tin and/or antimony therefrom. Preferably the applicants perform this soft lead refining step as described in the co-pending patent application EP 19154606.8.

In an embodiment of the present invention, the at least one contaminant is removed by treating the concentrated lead stream at a temperature of less than 600° C. with a first base and a first oxidant, resulting in the formation of a third supernatant dross containing a metalate compound of the corresponding contaminant metal, followed by separating the dross from the purified soft lead stream or product.

In this soft lead refining, the impure Pb feed is contacted preferably with a combination of NaOH and NaNO$_3$. The chemistry which is intended with these chemicals may be represented by the following reactions:

$$5\ Pb + 6\ NaOH + 4\ NaNO_3 \rightarrow 5\ Na_2PbO_3 + 2\ N_2 + 3\ H_2O \quad (I)$$

$$5\ Na_2PbO_3 + 4\ As + 2\ NaOH \rightarrow 4\ Na_3AsO_4 + 5\ Pb + H_2O \quad (II)$$

$$Na_2PbO_3 + Sn \rightarrow Na_2SnO_3 + Pb \quad (III)$$

$$5\ Na_2PbO_3 + 3\ H_2O + 4\ Sb \rightarrow 4\ NaSbO_3 + 6\ NaOH + 5\ Pb \quad (IV)$$

The key to this chemistry is the enabling of the generation of the intermediate sodium plumbate (Na$_2$PbO$_3$) by reaction (I). This intermediate plumbate is able to react with the impurities As, Sn and Sb according to the respective reactions (II) to (IV) and captures these each time in the respective sodium metalate compound while setting the Pb free again. The formed sodium metalate compounds are respectively sodium arsenate, sodium stannate and sodium antimonate.

The respective sodium metalate compounds collect in a supernatant phase, typically called the "dross" or sometimes also "slag". These terms are often used interchangeably, though the term "slag" is typically used for a liquid phase, while "dross" is typically meaning a phase with a less fluid, more solid consistency. The term "slag" is more typically used in the context of producing high melting point non-ferrous metals, such as copper, and is therefore usually a fluid, often comprising primarily metal oxides. The term "dross" is used more frequently in the context of lower melting point non-ferrous metals, such as Sn, Pb, Zn, Al, and which are often in a solid or dusty form. The delineation between these two terms regarding consistency is however not always clear.

The dross of the soft lead refining step may be skimmed off, and may further be processed for the recovery of at least some of its constituents.

In an embodiment of the process according to the present invention the third supernatant dross comprises at most 1.0% wt of chlorine, preferably at most 1.0% wt of total halogens.

The applicants have found that the specified low content of chlorine and/or other halogens in the third supernatant dross makes the third supernatant dross more suitable for being introduced into an upstream pyrometallurgical process step, preferably to a process step wherein at least one of the sodium metalates of Sn, Sb and As may be reduced to yield their respective metal Sn, Sb or As, preferably with also the Pb ending up in its elementary form.

The third supernatant dross is more acceptable in a pyrometallurgical process step thanks to its limited chlorine and/or halogen content. The low chlorine content of the third supernatant dross reduces the risk for entrainment of valuable metals into the exhaust gas from any pyrometallurgical process step in which an exhaust gas is produced, and thus also reduces the risk for the formation of sticky solid precipitates on coolers, filters and other equipment items in the exhaust gas treatment equipment associated with such a pyrometallurgical process step.

In an embodiment of the process according to the present invention the third supernatant dross is recycled to a process step upstream of the first vacuum distillation step. This brings the advantage that the metal values, in particular any entrained lead, may readily be recovered as part of one of the target prime products of the process according to the present invention. A major portion of the lead entrained in the third supernatant dross may preferably end up as part of the soft lead prime product, or, if needed, may be made to end up in the third concentrated lead stream introduced elsewhere in this document and become part of the hard lead prime product.

The advantage of this dross recycle capability is that it enables an overall process of much lower complexity, in particular in comparison with the very complex wet chemistry recovery paths described in U.S. Pat. No. 1,674,642.

The suitability of the third supernatant dross for being recycled to a pyrometallurgical process step allows to simultaneously remove in one single process step more than one contaminant from the first concentrated lead stream, in this case As, Sb and Sn together. This represents a significant improvement as compared to the much more complex lead refining steps described in the art.

In an embodiment of the process according to the present invention, the first tin-enriched product is subjected to a second distillation step separating off by evaporation primarily lead and antimony from the first tin-enriched product, thereby producing as overhead product a second concentrated lead stream and a second bottom product.

In an embodiment of the process according to the present invention a fresh feed containing lead is added to the feed of the second distillation step. The applicants have found that an amount of lead is desirable in the feed to the second distillation step, because more lead dilutes the vapour phase in the distillation step. This brings the advantage of facilitating the evaporation of antimony in the second distillation step, hence improving the quality of the separation that may be obtained in the second distillation step.

The lead dilutes the vapour phase in the distillation step and thus acts as a kind of carrier for the antimony. As a result, the lead promotes the removal of antimony from the main tin stream and hence contributes in ultimately obtaining a high purity tin prime product.

In an embodiment of the process according to the present invention the second concentrated lead stream is subjected to a third distillation step separating off by evaporation primarily lead and antimony from the second concentrated lead stream, thereby producing as overhead product a third concentrated lead stream and a third bottom product. The applicants have found that the second concentrated lead stream as overhead of the second distillation step is a highly suitable basis for obtaining a hard lead prime product, because the tin that is entrained in this stream may readily be removed from most of the lead and antimony by another distillation step. The third distillation step may fully target the selective evaporation of antimony, and of lead when present, from its feedstock into the third concentrated lead stream as its overhead.

In an embodiment of the process according to the present invention a fresh feed containing lead is added to the feed of the third distillation step. The applicants have found that an amount of lead is also desirable in the feed to the third distillation step, because the lead facilitates the evaporation of antimony. This brings the advantage of facilitating the evaporation of antimony in the third distillation step, hence improving the quality of the separation that may be obtained in the third distillation step. The lead dilutes the vapour phase in the distillation step and thus acts as a kind of carrier for the antimony. As a result, the lead promotes the recovery of most of the antimony in the third concentrated lead stream and hence contributes to an efficient production of the hard lead prime product. The second concentrated lead stream may for instance contain about 40/40/20% wt of Pb/Sn/Sb. The applicants have found that this feed composition may further be improved. The applicants prefer to dilute the feed for the third distillation step by the addition of lead containing fresh feed down to about 10-12% wt Sb and/or 18-10% wt of Sn. The applicants have found that this provides more vapour phase in the third distillation step, and also reduces the melting point of the feed. This allows for a better removal of Sb towards the third concentrated lead stream as overhead, from the Sn staying in the third bottom product. The extra benefit is, if the third bottom product is recycled to a location upstream of the second distillation step, that the better separation in the third distillation step reduces the amount of antimony that circulates over the second and third distillation steps.

In an embodiment of the process according to the present invention the third bottom product is at least partially and preferably entirely recycled to the feed of the second distillation step and/or to the feed of the fractional crystallisation step. The applicants have found that the third bottom product has a highly suitable composition for being recycled to at least one of the indicated locations upstream in the process according to the present invention, thanks to the high purity in valuable metals and the low content of non-target metals in the third bottom product. This brings the advantage that the valuable metals may be recovered into the appropriate prime products without high process burdens. The applicants prefer to make the selection of the process location for recycling the third bottom product to dependent on the silver content of the stream, because the fractional crystallisation step is able to remove silver and thereby avoid the build-up of silver in the process above acceptable levels.

In an embodiment, the process according to the present invention further comprises the step of removing at least one contaminant selected from the metals arsenic and tin from the third concentrated lead stream, thereby producing a purified hard lead stream as a hard lead product. The applicants have found that the third concentrated lead stream may be further refined by means known in the art to obtain a purified hard lead stream as the hard lead product.

In an embodiment of the process according to the present invention the at least one contaminant is removed from the third concentrated lead stream by treating the third concentrated lead stream at a temperature of less than 600° C. with a second base and a second oxidant, resulting in the formation of a fourth supernatant dross containing a metalate compound of the corresponding contaminant metal, followed by separating the fourth supernatant dross from the purified hard lead stream.

The third concentrated lead stream is contacted preferably with a combination of NaOH and NaNO$_3$. The chemistry which is intended with these chemicals may be represented by the following reactions:

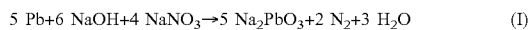
$$5\ Pb + 6\ NaOH + 4\ NaNO_3 \rightarrow 5\ Na_2PbO_3 + 2\ N_2 + 3\ H_2O \quad (I)$$

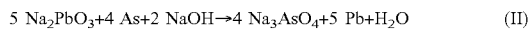
$$5\ Na_2PbO_3 + 4\ As + 2\ NaOH \rightarrow 4\ Na_3AsO_4 + 5\ Pb + H_2O \quad (II)$$

$$Na_2PbO_3 + Sn \rightarrow Na_2SnO_3 + Pb \quad (III)$$

The key to this chemistry is the enabling of the generation of the intermediate sodium plumbate (Na$_2$PbO$_3$) by reaction (I). This intermediate plumbate is able to react with the impurities As and/or Sn according to the respective reactions (II) to (III) and captures these each time in the respective sodium metalate compound while setting the Pb free again. The formed sodium metalate compounds are respectively sodium arsenate and sodium stannate.

The respective sodium metalate compounds collect in a supernatant phase, typically called the "dross" or sometimes also "slag".

The fourth supernatant dross may be skimmed off, and may further be processed, preferably in an upstream process step, for the recovery of at least some of its constituents.

In an embodiment of the process according to the present invention the fourth supernatant dross comprises at most 1.0% wt of chlorine, preferably at most 1.0% wt of total halogens.

The applicants have found that the specified low content of chlorine and/or other halogens in the fourth supernatant dross makes the dross more suitable for being introduced into an upstream pyrometallurgical process step, preferably to a process step wherein at least one of the sodium metalates of Sn and As may be reduced to yield their respective metal Sn or As, preferably with also the Pb ending up in its elementary form.

The fourth supernatant dross is more acceptable in a pyrometallurgical process step thanks to its limited chlorine and/or halogen content. The low chlorine content of the dross reduces the risk for entrainment of valuable metals into the exhaust gas from any pyrometallurgical process step in which an exhaust gas is produced, and thus also reduces the risk for the formation of sticky solid precipitates on coolers, filters and other equipment items in the exhaust gas treatment equipment associated with such a pyrometallurgical process step.

In an embodiment of the process according to the present invention the fourth supernatant dross is recycled to a process step upstream of the first vacuum distillation step. This brings the advantage that the metal values, in particular any entrained lead, may readily be recovered as part of one of the target prime products of the process according to the present invention. A major portion of the lead entrained in the fourth supernatant dross may preferably end up as part of the soft lead prime product, or, if needed, be made to return to the third concentrated lead stream and become part of the hard lead prime product.

The advantage of this dross recycle capability is that it enables an overall process of much lower complexity, in particular in comparison with the very complex wet chemistry recovery paths described in U.S. Pat. No. 1,674,642.

The suitability of the fourth supernatant dross for being recycled to a pyrometallurgical process step allows to simultaneously remove in one single process step more than one contaminant from the first concentrated lead stream, in this case As and Sn together. This represents a significant improvement as compared to the much more complex lead refining steps described in the art.

In an embodiment of the process according to the present invention the third concentrated lead stream comprises at least 0.50% wt and at most 15.0% wt of antimony. The presence of antimony in the range as specified brings the benefit of improving the properties of the hard lead prime product derived from the third concentrated lead stream in view of the end-uses that prefer hard lead over soft lead.

In an embodiment of the process according to the present invention the second bottom product is further refined to obtain a high purity tin prime product. The applicants have found that the second bottom product is highly suitable for being further refined to obtain a high purity tin prime product having excellent economic value.

In an embodiment of the process according to the present invention the second bottom product is treated with aluminium metal, preferably in stoichiometric excess relative to the amount of antimony present, preferably accompanied by mixing and cooling the reacting mixture down to below 400° C., followed by separating off the dross containing Al/Sb/As that is formed by the treatment. The applicants have found that the aluminium readily forms solid intermetallic compounds with trace contaminants in the tin stream, in particular with antimony. The applicants prefer to use a stoichiometric excess of aluminium, because this is more effective in removing antimony while any remaining aluminium is fairly readily removable, as described further in this document. The mixing and cooling are facilitating the reaction and separation of the solid compounds formed from the molten tin. The applicants prefer to cool down to a temperature of about 250° C., because they have found that this provides the better balance between the reaction kinetics favoured by high temperatures and an improved separation, favoured by lower temperatures. The dross containing Al/Sb/As that is formed may be skimmed off and may be recycled to an upstream pyrometallurgical process step. The applicants prefer to collect the dross containing Al/Sb/As in steel drums that are closed and sealed, in order to avoid contact of the dross with water, which could generate the formation of the highly toxic gasses arsine and/or stibine. The aluminium is preferably added as granules, offering a high surface area without leading to dust problems. The applicants prefer to add these granules to a bath without violent mixing, preferably static, in order to avoid that any wet granule could explode due to the sudden contact with the hot liquid tin.

In an embodiment of the process according to the present invention the second bottom product, post the aluminium treatment and preferably also after the removal of the dross containing Al/Sb/As, is treated with a third base, preferably selected from NaOH, Ca(OH)$_2$ and Na$_2$CO$_3$ and combinations thereof, more preferably NaOH, followed by separating off the dross containing base that is formed by the treatment. The applicants prefer to skim off the dross containing Al/Sb/As before the addition of the third base, in order to need less of that base. The applicants prefer to use NaOH as the third base because this forms a sodium aluminate dross which is more acceptable for recycle to an upstream pyrometallurgical process step. The applicants prefer to perform this treatment iteratively in successively repeated steps and based on an analysis of the tin stream for its aluminium content, in order to save on chemicals consumption. The intended chemistry may generate hydrogen gas, so the applicants prefer to throw an amount of sulphur granules on the reacting liquid, such that the sulphur ignites at the hot process temperatures and burns the hydrogen that may have evolved from the reaction. The dross may be stiffened by adding silicon dioxide, preferably in the form of sand.

In an embodiment of the process according to the present invention the second bottom product, post the treatment with the third base, is treated with sulphur, followed by separating off the dross containing S that is formed by the treatment. The sulphur reacts with the sodium and forms a Na$_2$S dross. At the end of this treatment, the applicants prefer to intensify the stirring rate in order to draw in more oxygen from the ambient air, which oxidizes the sulphur remaining after the reaction, and the sulphur oxides that are formed may readily escape from the liquid final product.

In an embodiment of the process according to the present invention, at least a part of the process is electronically monitored and/or controlled, preferably by a computer program. The applicants have found that the control of steps from the process according to the present invention electronically, preferably by a computer program, brings the advantage of a much better processing, with results that are much more predictable and which are closer to the process targets. For instance on the basis of temperature measurements, if desired also pressure and/or level measurements and/or in combination with the results of chemical analyses of samples taken from process streams and/or analytical results obtained on-line, the control program may control the equipment relating to the supply or removal of electrical energy, supply of heat or of a cooling medium, a flow and/or a pressure control. The applicants have found that such monitoring or control is particularly advantageous with steps that are operated in continuous mode, but that it may also be advantageous with steps that are operated in batch or semi-batch. In addition and preferably, the monitoring results obtained during or after the performance of steps in the process according to the present invention are also of use for the monitoring and/or control of other steps as part of the process according to the present invention, and/or of processes that are applied upstream or downstream of the process according to the present invention, as part of an overall process within which the process according to the present invention is only a part. Preferably the entire overall process is electronically monitored, more preferably by at least one computer program. Preferably the overall process is electronically controlled as much as possible.

The applicants prefer that the computer control also provides that data and instructions are passed on from one computer or computer program to at least one other computer or computer program or module of the same computer program, for the monitoring and/or control of other processes, including but not limited to the processes described in this document.

Example

The following example shows how the process according to the present invention may be operated in more detail and how the targeted effect is obtained. The example also shows how the process according to the invention may be part of a larger overall process which leads to more prime products. The enclosed FIG. 1 shows a flow diagram of the process steps and sequence that were operated in this example. The compositions reported in this example are expressed in weight units, and were the result of analyses of samples taken daily and averaging the results over a 73 day operating period.

In FIG. 1, the numbers represent the following claim features:

1. Crude solder composition as feed to the pre-treatment step 100
2. NaOH added in the pre-treatment step 100
3. Sulphur added in the pre-treatment step 100
4. First supernatant dross from pre-treatment step 100
5. Second supernatant dross from pre-treatment step 100
6. Molten solder mixture obtained from pre-treatment step 100
7. First concentrated lead stream as overhead from vacuum distillation step 200
8. First bottom product of the first vacuum distillation step 200
9. First silver-enriched liquid drain product from the liquid end of the crystallisation step 300
10. First tin-enriched product from crystallisation step 300
11. Fresh feed added to second vacuum distillation step 400
12. Second concentrated lead stream as overhead product from second vacuum distillation step 400
13. Second bottom product from second vacuum distillation step 400
14. Aluminium nuggets to tin refining step 500
15. Third base added in tin refining step 500
16. Sulphur added in tin refining step 500
17. Dross containing Al/Sb/As from tin refining step 500
18. Dross containing base from tin refining step 500
19. Dross containing sulphur from tin refining step 500
20. High purity tin prime product from tin refining step 500
21. Third concentrated lead stream as overhead product from third vacuum distillation step 600
22. Third bottom product, from third vacuum distillation step 600
23. Copper added to soft lead refining step 700
24. First base, added in soft lead refining step 700
25. First oxidant, added in soft lead refining step 700

26. Third supernatant dross formed in soft lead refining step 700
27. Purified soft lead stream or product from soft lead refining step 700
28. Purified hard lead stream or product from hard lead refining step 800
29. Left over of overhead product 21 from previous campaigns
30. Second base, added in hard lead refining step 800
31. Second oxidant, added in hard lead refining step 800
32. Fourth supernatant dross, formed in hard lead refining step 800
33. Fresh feed added to the crude solder pre-treatment step 100
34. Fresh feed added to third vacuum distillation step 600
35. Fresh feed added to fractional crystallisation step 300
36. Fresh feed added to first vacuum distillation step 200
100 Pre-treatment step
200 First vacuum distillation step
300 Fractional crystallisation step
400 Second vacuum distillation step
500 Tin refining step
600 Third vacuum distillation step
700 Soft lead refining step
800 Hard lead refining step For the analysis of a molten metal stream, a sample of liquid metal is taken, poured into a mould and allowed to cool to become solid. One surface of the solid sample is prepared by passing the sample one or preferably more times through a Herzog HAF/2 milling machine until a clean and flat surface is obtained. The clean and flat sample surface is then analysed using a spark optical emission spectroscopy (OES) apparatus Spectrolab M from the company Spectro Analytical Instruments (US), also available via the company Ametek (DE), whereby the parameters, crystals, detectors and tube may readily be selected and adapted in order to achieve the most appropriate performance for the desired accuracy and/or detection limit. The analysis offers results for a variety of metals in the sample, including copper, bismuth, lead, tin, antimony, silver, iron, zinc, indium, arsenic, nickel, cadmium and even the element sulphur, and this for most of these metals down to a detection limit of about 1 ppm wt.

For the analysis of a dross, the inventors prefer to use a properly calibrated X-ray fluorescence (XRF) technique, preferably using the PANalytical Axios XRF spectrometer of the company PANalytical B.V. (NL). This technique is also preferred over the OES mentioned above for analysing samples of metals containing significant amounts of contaminants, such as stream 6 and streams upstream thereof, in the flow diagram in the attached FIG. 1. Also with this technique, the details may readily be selected and adapted in order to optimize the results in terms of accuracy and/or detection limit most fitting the purpose of the analysis.

The crude solder starting material 1 originated from the refining of copper, lead and tin bearing materials in a copper smelter (not shown) which produces a "black copper" intermediate containing about 85% wt of Cu. This black copper was then subjected in a copper refinery to a series of pyrometallurgical refining steps (not shown) which produce on the one hand a higher purity copper prime product, and on the other hand a number of slag by-products. As part of the refinery operations, the crude solder starting material 1 is recovered from some of these refinery slags. Cleaning of this crude solder is performed by a sequence of pre-treatment steps 100 in order to remove a significant amount of the contained metal impurities, which presence would otherwise risk to become of nuisance in the downstream vacuum distillation steps. The target impurities for the cleaning steps are primarily Cu, Fe, Ni and/or Zn, and the objective of the crude solder cleaning down to acceptable levels is that the solder may be processed further, smoothly and flawlessly, using vacuum distillation.

The crude solder 1 was available from the upstream refinery operations at a temperature of about 835° C. In a first step of the cleaning operation sequence 100, the solder was cooled down to 334° C., and this in two steps. In the first cooling step, the crude solder was cooled to about 500° C. and a first dross was removed from the surface of the molten liquid metal. In the second cooling step, the crude solder was cooled further down to 334° C. and a second dross was removed from the surface of the molten liquid metal. The cooling step formed a total dross which contained the majority of the copper present in the crude solder, and which was removed as a by-product (not shown) and recycled in one of the upstream pyrometallurgical process steps. The total flow rate and the concentrations of the metals of interest in the remaining solder intermediate (stream 1) are provided in Table 1. The copper content in the solder had been decreased down to on average 3.0000% wt by this sequence of cooling steps and dross removals. Also the Fe and the Zn concentrations in the solder had decreased significantly. All the dross phases formed during the cooling operation were removed (not shown) and recycled upstream in the process to the smelter step, so that its valuable metal content could be valorised as much as possible.

TABLE 1

| The crude solder after the cooling step | |
|---|---|
| % wt | Crude solder 1 |
| Tons/day | 98.4 |
| Bi | 0.0163 |
| Cu | 3.0000 |
| Fe | 0.0007 |
| Ni | 0.0015 |
| Pb | 69.5000 |
| Sb | 0.8305 |
| Sn | 26.7414 |
| Zn | 0.0028 |
| Ag | 0.0290 |
| Au | 0.0010 |
| As | 0.0515 |
| Cd | 0.0010 |
| In | 0.0125 |
| S | 0.0025 |
| Te | 0.0007 |
| Total | 100.1914 |

In a second part of the cleaning operation sequence 100, solid sodium hydroxide (stream 2) was added to the solder intermediate of Table 1. In this treatment step, zinc was bound by the sodium hydroxide, presumably to form $Na_2ZnO_2$, and forming a separate phase which separated as a first supernatant solid dross from the solder and which was removed as stream 4. As a result, the zinc content in the solder stream 6 had further been decreased. The amount of sodium hydroxide was adjusted such that the Zn concentration in the solder was decreased down to 13 ppm weight (Table 2). The dross which was formed in this step was also recycled (stream 4) to the upstream smelter step, where zinc may be fumed out and recovered as zinc oxide dust.

In the next part of the cleaning operation sequence 100, after the addition of sodium hydroxide and the removal of the first supernatant solid dross phase 4, also an amount of elemental sulphur (stream 3), representing about 130% of stoichiometry relative to the amount of copper present in the metal phase, was added to further reduce the copper content of the solder. As elemental sulphur was used a granulated form of sulphur obtainable from the company Zaklady Chemiczne Siarkopol in Tarnobrzeg (PL). The sulphur 3 reacted primarily with copper to form copper sulphides which moved into a second supernatant dross. This second supernatant dross was then removed as stream 5 and recycled to a suitable upstream process step. After the sulphur addition in step 100, a further amount of sodium hydroxide (stream 2) was added to chemically bind any leftover traces of sulphur to form yet another dross. After allowing some time for the reaction, a handful of granulated sulphur 3 was scattered/spread over the bath surface. The sulphur ignited and burned any hydrogen which could have evolved from the liquid as a by-product from the reaction. Subsequently, a small amount of white sand was scattered/spread over the bath in order to dry/stiffen the dross before its removal from the process (stream not shown in the drawing) and its recycle to an upstream process step. The thus obtained cleaned solder (stream 6, of which the flow rate and composition is provided in Table 2) contained only 38 ppm Cu and was further processed as the molten solder mixture obtained from pre-treatment step 100 by means of vacuum distillation in step 200. The second supernatant dross 5 was reprocessed in the upstream refinery process, so that its valuable metal content could be valorised.

TABLE 2

Cleaned solder for vacuum distillation

| Wt % | Molten solder mixture - 6 |
|---|---|
| Tons/day | 72.0 |
| Bi | 0.0326 |
| Cu | 0.0038 |
| Fe | 0.0004 |
| Ni | 0.0009 |
| Pb | 73.1206 |
| Sb | 0.8012 |
| Sn | 25.8694 |
| Zn | 0.0013 |
| Ag | 0.0500 |
| As | 0.0871 |
| Au | 0.0015 |
| Cd | 0.0020 |
| In | 0.0202 |
| S | 0.0053 |
| Te | 0.0010 |
| Total | 99.9973 |

The molten solder mixture 6 was further processed using vacuum distillation (step 200), at an average temperature of 982° C. and an average absolute pressure of 0.012 mbar (1.2 Pa). The vacuum distillation step produced two product streams. On the one hand we obtained as overhead stream 7 a first concentrated lead stream which contained mainly lead and on the other hand we obtained as the first bottom product 8 of the first distillation step 200 a product stream which contained mainly tin. The flow rates and compositions of these two distillation product streams 7 and 8 are provided in Table 3.

TABLE 3

Product streams of the first vacuum distillation 200

| Wt % | Overhead 7 | Bottom 8 |
|---|---|---|
| Tons/day | 61.8 | 24.8 |
| Bi | 0.0425 | 0.0014 |
| Cu | 0.0000 | 0.0122 |
| Fe | 0.0000 | 0.0015 |
| Ni | 0.0000 | 0.0028 |
| Pb | 99.5375 | 1.0055 |
| Sb | 0.2233 | 1.9800 |
| Sn | 0.1006 | 96.3129 |
| Zn | 0.0018 | 0.0001 |
| Ag | 0.0031 | 0.1400 |
| As | 0.0746 | 0.0700 |
| Au | 0.0000 | 0.0043 |
| Cd | 0.0024 | 0.0000 |
| In | 0.0057 | 0.0460 |
| S | 0.0071 | 0.0000 |
| Te | 0.0014 | 0.0000 |
| Total | 100.0000 | 99.5767 |

The first vacuum distillation step 200 was performed in continuous mode, and was able to operate during a time period of about three (3) years without the observation of any blocking or clogging of the distillation equipment due to the formation of intermetallic compounds.

The first concentrated lead stream 7 became available from the distillation equipment at a temperature of about 562° C. The temperature of stream 7 was controlled to become about 450° C. while being stirred before this stream was further refined. Consecutive volumes of 100-120 tons of stream 7 were allowed to collect in a tank. These volumes were subjected batchwise to the soft lead refining operation 700. A sample was taken from each batch and analysed for As, Sn and Sb to determine the amounts of solid sodium hydroxide (stream 24) and solid sodium nitrate (stream 25) that were required to react with the As, Sn and Sb present in the metal phase, and these amounts were added as first base and first oxidant. Sampling and analysis were repeated after allowing some time for the reaction and after the removal of the third supernatant dross 26 formed by the reaction. If the result was not satisfactory, the process step was repeated. For the total volume of soft lead that was produced over the 73 day operating period, 29.3 metric tons of sodium hydroxide (401 kg/day) and 15.5 metric tons of sodium nitrate (212 kg/day) were used in the process for removing most of the on average 46 kg/day of As, 62 kg/day of Sn and 138 kg/day of Sb, a total of on average 246 kg/day of the 3 elements together, that were present in the feed to step 700 with stream 7. This refining step formed in each batch a third supernatant dross phase which contained the majority of the As, Sn and Sb present in the first concentrated lead stream 7 and which was removed as a by-product (stream 26). The third supernatant dross phase was sampled and analysed for chlorine content using the method according to DIN EN 14582 standard. The analysis showed a chlorine presence of about 129 ppm by weight. The soft lead prime product 27 was then poured into moulds and allowed to solidify and cool to become lead ingots.

In most of the batches, a small amount of copper 23 was added into the feed to step 700 in order to produce a quantity of Cu-containing soft lead. The small amount of copper present is improving the mechanical properties of the soft lead, which makes the soft lead more suitable for being rolled into lead film for the construction industry or for the lead cladding of surfaces. A number of batches which contained above average contents of Bi were also kept apart as Bi-rich soft lead, acceptable in particular end-uses and bringing the advantage that Bi-containing raw materials become more readily acceptable for the process according to the present invention and/or for the upstream processes providing a feedstock for it. This refining of soft lead was performed batchwise in the same equipment as the refining of hard lead, which is discussed further below. The transition between the batches of soft lead and hard lead generates an amount of intermediate quality material, which is commercialised as "unrefined soft lead". The daily average production rates (spread over the 73 day long production period considered) and compositions of these various soft lead end product streams 27 are given in Table 4.

TABLE 4

Composition of the soft lead end products 27 (wt %)

| Soft lead Products 27 | Unrefined Soft lead | Cu-tagged Soft lead | Bi-rich Soft lead |
|---|---|---|---|
| Tons/day | 5.7 | 39.8 | 14.8 |
| Bi | 0.0905 | 0.0319 | 0.0568 |
| Cu | 0.0001 | 0.0428 | 0.0008 |
| Fe | 0.0000 | 0.0000 | 0.0000 |
| Ni | 0.0000 | 0.0000 | 0.0000 |
| Pb | 99.6306 | 99.9026 | 99.9240 |
| Sb | 0.2279 | 0.0000 | 0.0000 |
| Sn | 0.0208 | 0.0006 | 0.0004 |
| Zn | 0.0001 | 0.0001 | 0.0001 |
| Ag | 0.0032 | 0.0034 | 0.0025 |
| As | 0.0259 | 0.0002 | 0.0002 |
| Cd | 0.0002 | 0.0000 | 0.0000 |
| In | 0.0007 | 0.0001 | 0.0001 |
| S | 0.0006 | 0.0003 | 0.0003 |
| Te | 0.0000 | 0.0000 | 0.0000 |
| Au | 0.0000 | 0.0000 | 0.0000 |
| Total | 99.7727 | 99.9820 | 99.9852 |

The first bottom product 8 from first vacuum distillation step 200 was mixed with the third bottom product 22 from the downstream third vacuum distillation step 600 and the mixture was fed to the fourth zone of a first crystalliser having 12 temperature zones. The crystalliser was a cylindrical vessel slightly tilted from being fully horizontal and comprised an internal rotating screw for moving the crystals that are formed from the lower end to the higher end of the cylindrical vessel. The temperature zones were numbered from 0 to 11 from the lower end to the higher end. By appropriate heating and cooling means, a temperature profile was established inside the crystalliser. The temperature of zone 3 which was receiving the feed was about controlled to be about 210° C. The temperature increased stepwise from zone 3 to zone 11 (230-250° C.) upwards in the crystalliser, where the tin-rich crystals are removed from the apparatus. The temperature reduced slightly downwards in the crystalliser, from zone 3 to zone 0 (199° C.), but was raised again in zone 0, up to about 220° C., to assure that the temperature in that zone always remained above the liquidus line in the phase diagram, such that any growth of solids on the blades of the screw was avoided, which might otherwise introduce the need for operator intervention and temporary decommissioning of the equipment.

Before feeding the feed stream to the crystalliser, the stream was passed through a buffer vessel having a holdup of a few hours of production, in which some mixing smoothens out any temperature changes that may have occurred upstream, such that the temperature of the feed entering the crystalliser into zone 3 is fairly constant and any changes thereof are very slow. In addition the temperature of the feed to zone 3 is maintained somewhat above the temperature in zone 3 of the crystalliser, to avoid solid formation in the supply system. By entering zone 3 of the crystalliser the feed stream is cooled down and comes inside the range within which a stream having this composition separates into a solid phase of small crystals that are enriched in tin content, in equilibrium with a liquid phase that is leaner in tin but richer in lead and in precious metals. The temperature increase of the liquid moving down in the crystalliser from zone 1 further down to 0 brought the benefit that growth of solids on the perimeter of the blades of the screw was prevented in the lower part of the cylindrical vessel, such that there remained sufficient space below the screw blades for allowing liquid to flow from the upper end of the cylindrical vessel to the lower end.

The crystalliser was tilted, such that the liquid phase in the vessel was readily able to move by gravity from the higher end towards the lower end of the apparatus. The turning screw inside the crystalliser moved the crystals in the opposite direction through the continuous liquid phase present in the crystalliser. The liquid level in the crystalliser was maintained below the overflow point for the crystals, to minimize liquid entrainment with the first tin-enriched product, but sufficiently high to facilitate the transfer of heat from vessel wall to vessel content. The crystals ending up at the higher end had become enriched in tin and substantially all of the lead and precious metals from the feed were retrieved in the liquid first drain leaving the crystalliser at the lower end. This first drain further contained tin in a significant amount but at a concentration below the level of tin in the crystalliser feed.

The Sn crystals were removed from the upper end of the first crystalliser and were introduced into the fourth zone (again zone 3) of a second crystalliser also having 12 temperature zones numbered from 0 to 11. In the second crystalliser also a temperature profile was applied, similar to the one in the first crystalliser, which caused a further separation of a second liquid drain from the first tin-enriched crystals before these crystals leave the second crystalliser at the upper end (stream 10).

The antimony entering with the crystalliser feed is primarily following the path of the main flow of tin. The drain from the second crystalliser was recycled to the first crystalliser, where it was mixed in with the feed. When the Pb concentration was deemed excessive, the drain from the second crystalliser was temporarily recycled to the feed of the upstream first vacuum distillation step 200 in order to maintain a higher concentration factor of Ag from vacuum distillation bottom stream 8 to net first silver-enriched liquid drain product 9. Also when the Cu concentration in the crystalliser streams, and thus also in the drain from the second crystalliser, this drain is—at least temporarily— preferably recycled to a process step further upstream than the feed to the first crystalliser, preferably to the feed of the first step of the cleaning operation sequence 100, to be mixed with the crude solder composition 1.

The first silver-enriched liquid drain product was leaving the first crystalliser as a Sn/Pb alloy by-product containing most of the Ag present in the crystalliser feed. The flow rates and compositions of the outlet product streams 9 and 10 of the 2-crystalliser assembly in step 300 are given in Table 5. Sb was found to also enrich in the first tin-enriched crystal phase leaving the second crystalliser, but some Sb was also retrieved in the first silver-enriched liquid drain product. The silver-enriched liquid drain product 9 of Table 5 represents the net drain volume and its composition. Temporarily and depending on its composition, recycle of the silver-enriched liquid drain product was operated from the lower end of the first crystalliser to the feed of the first crystalliser in order to further boost the concentration factor of Ag from the crystalliser feed (streams 8+22) to the net first silver-enriched liquid drain product 9.

TABLE 5

Product streams of the crystalliser assembly

| Wt % | First silver-enriched liquid drain product 9 | First tin-enriched product 10 |
|---|---|---|
| Tons/day | 1.3 | 27.0 |
| Bi | 0.0079 | 0.0010 |
| Cu | 0.2900 | 0.0014 |
| Fe | 0.0012 | 0.0016 |
| Ni | 0.0215 | 0.0023 |
| Pb | 16.5000 | 0.2387 |
| Sb | 0.4020 | 2.1000 |
| Sn | 79.5000 | 97.0536 |
| Zn | 0.0042 | 0.0000 |
| Ag | 2.8000 | 0.0100 |
| As | 0.1144 | 0.0680 |
| Cd | 0.0001 | 0.0000 |
| In | 0.1039 | 0.0411 |
| S | 0.0000 | 0.0000 |
| Te | 0.0000 | 0.0000 |
| Au | 0.0129 | 0.0034 |
| Total | 99.7581 | 99.5211 |

The net first silver-enriched liquid drain product 9 from the first crystalliser was transferred to a downstream purification step (not shown) to recover all precious metals as well as the Sn and Pb. For that purpose, the silver-enriched liquid drain product was cast into anodes and submitted to an electrolysis step wherein pure Pb and Sn containing cathodes were produced and the other metals remain in the anode slimes. Typical conditions of this electrolysis step are: Electrolyte based on hexafluorosilicic acid ($H_2SiF_6$), fluoroboric acid and/or phenyl sulphonic acid; temperature about 40° C.;

current density 140-200 $A/m^2$; electrode spacing about 100 mm. Antimony may be added to the anode composition, typically to a concentration of about 1.5% wt. This brings the advantage that the anode slimes remain attached to the anodes and do not disperse in the electrolyte. To avoid full anode passivation, leading to inhibition of the electrolysis, periodically and consecutively a portion of the anodes may be removed from the bath, their anode slimes be removed, e.g. mechanically, and the cleaned anodes may then be replaced in the cell. The anodes may also be designed such that the cleaned anodes have become sufficiently thin such that it is more efficient and/or effective to melt them into new anodes. These anode slimes (about 180 kg/day on average) were recovered, e.g. by filtration, from the entrained electrolyte and these anode slimes contained about 20% wt of silver and also a much smaller concentration of gold, together with most of the other metals present in the first silver-enriched liquid drain product, including antimony and any platinum group metals (PGM's). The anode slimes were further processed for recovery of the silver and the other precious metals. The filtrate was recycled to the electrolysis cell.

The first tin-enriched crystals 10 from the second crystalliser were further processed through the second vacuum distillation step 400, operated at an average temperature of 1049° C. and an average absolute pressure of 0.005 mbar (0.5 Pa). Spread over the 73 day operating period, an amount of 157.6 tonnes of lead containing feedstocks 11, on average about 2.2 metric tons per day, was gradually added to the first tin-enriched crystals to keep the solidification point low of the overhead product from step 400. The flow rate and composition of stream 11 is given in Table 6.

TABLE 6

Added feedstock in feed to the second vacuum distillation

| Wt % | Pb containing feedstocks 11 |
|---|---|
| Tons/day | 2.2 |
| Bi | 0.0299 |
| Cu | 0.0161 |
| Fe | 0.0018 |
| Ni | 0.0003 |
| Pb | 58.8711 |
| Sb | 0.0006 |
| Sn | 41.0558 |
| Zn | 0.0001 |
| Ag | 0.0036 |
| As | 0.0015 |
| Cd | 0.0000 |
| In | 0.0017 |
| S | 0.0002 |
| Te | 0.0000 |
| Au | 0.0001 |
| Total | 99.9827 |

The second vacuum distillation step 400 produced two product streams. On the one hand we obtained as overhead product 12 a product stream which contained mainly most of the lead, antimony and silver from the feed, plus some tin, and on the other hand we obtained as the second bottom product 13 a product stream which contained primarily tin with only trace quantities of other components. The flow rates and compositions of these two distillation product streams 12 and 13 are shown in Table 7.

TABLE 7

Product streams of the second vacuum distillation

| Wt % | Overhead 12 | Bottom 13 |
|---|---|---|
| Tons/day | 3.6 | 25.6 |
| Bi | 0.0189 | 0.0004 |
| Cu | 0.0000 | 0.0028 |
| Fe | 0.0000 | 0.0019 |
| Ni | 0.0000 | 0.0025 |
| Pb | 37.8602 | 0.0011 |
| Sb | 13.0000 | 0.3800 |
| Sn | 47.7097 | 99.4584 |
| Zn | 0.0000 | 0.0000 |
| Ag | 0.0560 | 0.0029 |
| As | 0.3900 | 0.0178 |
| Au | 0.0000 | 0.0036 |
| Cd | 0.0000 | 0.0000 |
| In | 0.3050 | 0.0006 |
| S | 0.0001 | 0.0000 |
| Te | 0.0000 | 0.0000 |
| Total | 99.3400 | 99.8719 |

The second vacuum distillation step 400 was performed in continuous mode, and was able to operate during a time period of about three (3) years without the observation of any blocking or clogging of the distillation equipment due to the formation of intermetallic compounds.

The second bottom product 13 from step 400 was further refined batchwise in three consecutive steps, collectively shown in the flow diagram as tin refining step 500. The first tin refining step consisted of cooling the second bottom product 13 and adding an amount of aluminium nuggets (stream 14) to the second bottom product which was having an average temperature of 430° C., under agitation, in order to react with and remove Sb and As down to a level in compliance with established international industry standards. The amount of Al to be added was based on an analysis of the second bottom product 13 and included an extra above the stoichiometric requirement. After the reaction, the composition was again analysed and, if the result was insufficient, in particular the Sb content, an additional amount of Al was introduced for triggering a second reaction step. In total, on average an amount of about 4.3 kg of Al per metric ton of second bottom product 13 was used. About 30 minutes after the last addition, the heating and the agitation were stopped and the liquid molten metal composition was allowed to cool down. During this cooling, down to a temperature of on average about 250° C., a layer of Al/Sb/As containing dross was formed and this dross was periodically removed from the surface of the molten liquid metal. The dross was collected and stored in dry, closed and double-walled steel barrels to prevent contact with water or moisture which could lead to the formation of stibine and/or arsine. The barrels were removed as a by-product (stream 17) and were recycled to an upstream pyrometallurgical process step, where they were introduced unopened into a liquid bath of molten metal and/or slag, thereby avoiding any risk for contact with moisture.

After raising the temperature of the tin product again up to about 330° C., the molten liquid metal was subjected to a second tin refining step in which solid sodium hydroxide (stream 15) was added as the third base. In this treatment step, aluminium was bound by the sodium hydroxide, presumably to form $Na_3AlO_3$, and forming a separate phase which separated as a supernatant solid dross from the molten liquid metal and which was removed as stream 18. After allowing some time for the reaction, a handful of granulated sulphur was scattered/spread over the bath surface. The sulphur ignited and burned any hydrogen which could have evolved from the molten liquid metal as a by-product from the reaction. As a result, the aluminium content in the second bottom product 13 was further decreased. The amount of sodium hydroxide to be added was adjusted such that the aluminium concentration in the second bottom product decreased down to below the detection limit of 1 ppm weight (Table 8). The dross which was formed in this step was also recycled (stream 18) to an upstream pyrometallurgical process step.

In the third and last tin refining step an amount of elemental sulphur (stream 16) was added to further reduce the copper content of the molten liquid metal and to remove any sodium hydroxide that remained from the second tin refining step. As elemental sulphur was used a granulated form of sulphur obtainable from the company Zaklady Chemiczne Siarkopol in Tarnobrzeg (PL). The sulphur 16 reacted primarily with copper to form copper sulphides and with sodium hydroxide to form $Na_2SO_2$ which moved into another supernatant dross phase. After the sulphur addition the agitator was kept operating for about 10 minutes to oxidise any leftover traces of sulphur and forming another dross. The dross was removed from the molten liquid metal as stream 19. The thus obtained high purity Sn prime product (stream 20, of which the flow rate and composition is provided in Table 8) contained only 14 ppm Cu and was casted into ingots of 22 kg, stacked, weighed and strapped. The dross containing sulphur 19 was reprocessed in an upstream pyrometallurgical process step.

TABLE 8

High purity Sn end product

| Wt % | High purity Sn 20 |
|---|---|
| Tons/day | 24.6 |
| Bi | 0.0001 |
| Cu | 0.0014 |
| Fe | 0.0004 |
| Ni | 0.0000 |
| Pb | 0.0008 |
| Sb | 0.0160 |
| Sn | 99.9758 |
| Zn | 0.0000 |
| Ag | 0.0030 |
| As | 0.0006 |
| Au | 0.0001 |
| Cd | 0.0000 |
| In | 0.0006 |
| S | 0.0000 |
| Te | 0.0000 |
| Al | 0.0001 |
| Total | 99.9989 |

The overhead product 12 of the second vacuum distillation step 400 was further processed in the third vacuum distillation step 600, operated at an average temperature of 1000° C. and an average absolute pressure of 0.033 mbar (3.3 Pa). The third vacuum distillation step 600 produced two product streams. On the one hand we obtained as overhead product 21 a product stream which contained mainly lead and antimony and on the other hand we obtained as the third bottom product 22 a product stream which contained mainly tin and part of the antimony, plus most of the precious metals present in the distillation feed. The flow rates and compositions of these two distillation product streams 21 and 22 are shown in Table 9.

TABLE 9

Product streams of the third vacuum distillation

| Wt % | Overhead 21 | Bottom 22 |
|---|---|---|
| Tons/day | 5.5 | 2.5 |
| Bi | 0.0474 | 0.0011 |
| Cu | 0.0000 | 0.0265 |
| Fe | 0.0000 | 0.0004 |
| Ni | 0.0000 | 0.0075 |
| Pb | 90.1133 | 0.7827 |
| Sb | 9.1014 | 2.1363 |
| Sn | 0.5379 | 96.8647 |
| Zn | 0.0002 | 0.0001 |
| Ag | 0.0100 | 0.0950 |
| As | 0.4700 | 0.0730 |
| Cd | 0.0019 | 0.0000 |
| In | 0.1860 | 0.0297 |
| S | 0.0022 | 0.0000 |
| Te | 0.0013 | 0.0000 |
| Au | 0.0000 | 0.0000 |
| Total | 100.4716 | 100.0170 |

The third vacuum distillation step 600 was performed in continuous mode, and was able to operate during a time period of about three (3) years without the observation of any blocking or clogging of the distillation equipment due to the formation of intermetallic compounds.

The third bottom product 22 was recycled to the first crystalliser of upstream step 300, where it was mixed in with first bottom product 8 from step 200, for recovering its valuable metals content.

The overhead product 21 was further refined in step 800, batchwise in the same equipment that was used during the soft lead refining step 700 of the first concentrated lead stream as overhead stream 7 from the first vacuum distillation step 200. Over the operating period of 73 days, in addition another 810.2 metric tons of overhead product from the third vacuum distillation that had been left over from previous campaigns (stream 29), on average about 11.1 tons/day, was mixed in with stream 21 and refined together therewith. The refining of this hard lead was performed batchwise in volumes of 100-120 tons of total feed. During the 73 days of operating time considered in this example, about 9 days were dedicated to the refining of 1159 tons of hard lead, at about 129 tons/day, and during 43 days the equipment was used for the refining of together 4400 tons of the soft lead products as described above, on average at about 102 tons/day.

The molten liquid metal feed of hard lead for the hard lead refining step 800 was first heated up to about 450° C. while being stirred. A sample was taken and analysed for As and Sn to determine the amounts of solid sodium hydroxide (stream 30) and solid sodium nitrate (stream 31) that was deemed required to remove the As and Sn from the molten liquid metal phase, and these amounts were added as the second base and the second oxidant. Over the 73 day operating period that was considered for this example, a total of 15.2 metric tons of sodium hydroxide (on average 208 kg/day) plus 7.6 metric tons of sodium nitrate (on average 104 kg/day) were added into this refining step for removing most of the on average 26 kg/day of As and 32 kg/day of Sn that was coming into step 800 with streams 21 and 29 together. Almost all of the 1502 kg/day of Sb present in the feed streams to hard lead refining step 800 remained in the purified hard lead product 28. This hard lead refining step formed a total fourth supernatant dross phase which contained the majority of the As and Sn present in the overhead products 21 and 29 and which was removed as a by-product (stream 32). The fourth supernatant dross phase was sampled and analysed for chlorine content with the method according to DIN EN 14582. The analysis showed a chlorine presence of about 130 ppm by weight. The flow rate and composition of the purified hard lead end product stream 28 is given in Table 10.

TABLE 10

Composition of the hard lead end product

| Wt % | Hard lead 28 |
|---|---|
| Tons/day | 15.9 |
| Bi | 0.0550 |
| Cu | 0.0000 |
| Fe | 0.0000 |
| Ni | 0.0000 |
| Pb | 91.4680 |
| Sb | 8.9900 |
| Sn | 0.0192 |
| Zn | 0.0001 |
| Ag | 0.0112 |
| As | 0.0025 |
| Cd | 0.0002 |
| In | 0.0005 |
| S | 0.0005 |
| Te | 0.0000 |

TABLE 10-continued

Composition of the hard lead end product

| Wt % | Hard lead 28 |
|---|---|
| Au | 0.0000 |
| Total | 100.5472 |

This hard lead refining step was thus targeting in step 800 only the removal of a total of on average 58 kg/day of impurities, which is significantly less than the removal target of step 700. In addition, the concentrations of As and Sn in the feed to step 800 were also higher than these in the feed to step 700. Step 800 therefore reaches its targets much easier than step 700. Relative to the total amount of (As+Sn+Sb) that enters the respective lead refining steps 700 and 800, the step 800 consumes significantly less chemicals and also produces significantly less supernatant dross than step 700, which also brings the benefit of causing a lesser burden for recycling the supernatant dross in the upstream pyrometallurgical process. It was also observed that in step 800, As and Sn could successfully be removed to very low levels while hardly any Sb needed to be removed.

Having now fully described this invention, it will be appreciated by those skilled in the art that the invention can be performed within a wide range of parameters within what is claimed, without departing from the scope of the invention, as defined by the claims.

The invention claimed is:

1. A metal composition comprising, on a dry weight basis,
   at least 6.0% wt and at most 30.0% wt of lead;
   at least 70.0% wt and at most 91% wt of tin;
   at least 95.0% wt and at most 99.0% wt of lead and tin together;
   at least 0.75% wt and at most 5.00% wt of silver;
   at least 0.24% wt of antimony; and
   further comprising, on the dry weight basis, at least one of:
   at least 0.05% wt and at most 0.5% wt of arsenic;
   at least 0.05% wt and at most 0.6% wt of copper;
   at least 0.0030% wt and at most 0.0500% wt of nickel;
   at least 0.0010% wt and at most 0.40% wt of bismuth;
   at most 1.0% wt of iron; or
   at least 0.0005% wt of gold;
   the balance being impurities.

2. The metal composition according to claim 1 being a molten liquid.

3. A process for the separation by fractional crystallization of a molten crude tin mixture containing lead and silver, into a first silver-enriched liquid drain product at the liquid end of the crystallization step and a first tin-enriched product at the crystal end of the crystallization step, whereby the first silver-enriched liquid drain product comprises, on a dry weight basis:
   at least 6.0% wt and at most 30.0% wt of lead;
   at least 70.0% wt and at most 91% wt of tin;
   at least 95.0% wt and at most 99.0% wt of lead and tin together;
   at least 0.75% wt and at most 5.00% wt of silver;
   at least 0.24% wt of antimony; and
   further comprising, on the dry weight basis, at least one of:
   at least 0.05% wt and at most 0.5% wt of arsenic;
   at least 0.05% wt and at most 0.6% wt of copper;
   at least 0.0030% wt and at most 0.0500% wt of nickel;

at least 0.0010% wt and at most 0.40% wt of bismuth;
at most 1.0% wt of iron; or
at least 0.0005% wt of gold;
the balance being impurities.

4. The process according to claim 3, wherein the crude tin mixture comprises at least 0.1% wt and at most 7.0% wt of lead.

5. The process according to claim 3, wherein the lead concentration in the crude tin mixture is at least 3.0 times the silver concentration in the crude tin mixture.

6. The process according to claim 3, wherein the crude tin mixture is at least partially obtained as the first bottom product from a first distillation step wherein lead (Pb) is removed from a molten solder mixture by evaporation, thereby obtaining as overhead product a first concentrated lead stream.

7. The process according to claim 3, wherein the first silver-enriched liquid drain product is subjected to a fourth distillation step wherein lead is removed by evaporation into a fourth concentrated lead stream as distillation overhead product, thereby producing a fourth distillation bottom product.

8. The process according to claim 7, wherein the fourth distillation bottom product is subjected to a fractional crystallization step which produces a second silver-enriched drain product at the liquid end and a second tin-enriched product at the crystal end.

9. The process according to claim 3, wherein either the first silver-enriched liquid drain product or the second silver-enriched liquid drain product is used as feed for being cast into at least one anode which is subjected to an electrorefining step for obtaining a cathode product rich in lead plus tin, and an anode slime rich in silver.

10. The process according to claim 6, wherein the fourth concentrated lead stream is combined with the first concentrated lead stream to obtain a fifth concentrated lead stream.

11. The process according to claim 6, further comprising the step of removing at least one contaminant selected from the metals arsenic, tin and antimony from a concentrated lead stream selected from the first concentrated lead stream, the fourth concentrated lead stream and the fifth concentrated lead stream to obtain a purified soft lead product.

12. The process according to claim 3, wherein the first tin-enriched product is subjected to a second distillation step separating off by evaporation primarily lead and antimony from the first tin-enriched product, thereby producing as overhead product a second concentrated lead stream and a second bottom product.

13. The process according to claim 12, wherein the second concentrated lead stream is subjected to a third distillation step separating off by evaporation primarily lead and antimony from the second concentrated lead stream, thereby producing as overhead product a third concentrated lead stream and a third bottom product.

14. The process according to claim 13, further comprising a step of removing at least one contaminant selected from the metals arsenic and tin from the third concentrated lead stream, thereby producing a purified hard lead stream as a hard lead product.

15. The process according to claim 12, wherein the second bottom product is further refined to obtain a high purity tin prime product.

\* \* \* \* \*